(12) United States Patent  
Raghavan et al.

(10) Patent No.: US 12,245,254 B2
(45) Date of Patent: Mar. 4, 2025

(54) DYNAMIC ANTENNA RADIATION PATTERN NOTIFICATION

(71) Applicant: QUALCOMM Incorporated, San Diego, CA (US)

(72) Inventors: Vasanthan Raghavan, West Windsor Township, NJ (US); Sony Akkarakaran, Poway, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 146 days.

(21) Appl. No.: 17/476,626

(22) Filed: Sep. 16, 2021

(65) Prior Publication Data

US 2023/0077568 A1    Mar. 16, 2023

(51) Int. Cl.
*H04W 72/51*    (2023.01)
*H04W 72/044*   (2023.01)
*H04W 72/21*    (2023.01)

(52) U.S. Cl.
CPC ......... *H04W 72/51* (2023.01); *H04W 72/044* (2013.01); *H04W 72/21* (2023.01)

(58) Field of Classification Search
CPC .............. H04W 72/51; H04W 72/044; H04W 72/21; H01Q 1/2266; H01Q 1/243; H04B 7/0608; H04B 7/0404
See application file for complete search history.

(56) References Cited

U.S. PATENT DOCUMENTS

| | | | | |
|---|---|---|---|---|
| 9,318,794 | B2* | 4/2016 | Chang | H04W 8/24 |
| 11,569,892 | B2* | 1/2023 | Ali | H04B 7/0802 |
| 11,622,031 | B2* | 4/2023 | Zhao | H01Q 1/242 |
| | | | | 455/552.1 |
| 11,637,578 | B2* | 4/2023 | Lee | H05K 7/1427 |
| | | | | 455/230 |
| 2010/0045529 | A1* | 2/2010 | Shimizu | H04B 7/086 |
| | | | | 342/360 |
| 2013/0217450 | A1* | 8/2013 | Kanj | H01Q 21/293 |
| | | | | 455/575.7 |
| 2014/0347223 | A1* | 11/2014 | Hyde | H01Q 3/00 |
| | | | | 342/385 |

(Continued)

FOREIGN PATENT DOCUMENTS

| | | |
|---|---|---|
| EP | 3672210 A1 | 6/2020 |
| WO | 2012068660 A1 | 5/2012 |
| WO | 2020123088 A1 | 6/2020 |

OTHER PUBLICATIONS

International Search Report and Written Opinion—PCT/US2022/040995—ISA/EPO—Nov. 8, 2022.

*Primary Examiner* — Yuwen Pan
*Assistant Examiner* — Swati Jain
(74) *Attorney, Agent, or Firm* — QUALCOMM Incorporated

(57) ABSTRACT

A method at a UE for indicating change in physical state of the UE includes: determining a change of the UE from a first physical state of a plurality of physical states to a second physical state of the plurality of physical states; and transmitting one or more antenna system characteristics, corresponding to an antenna system of the UE, based on determining the change of the UE from the first physical state of the plurality of physical states to the second physical state of the plurality of physical states.

26 Claims, 19 Drawing Sheets

(56) References Cited

U.S. PATENT DOCUMENTS

| | | | | |
|---|---|---|---|---|
| 2017/0171740 A1* | 6/2017 | Wu | ............... | H04B 7/0693 |
| 2017/0238297 A1* | 8/2017 | Benjebbour | ............ | H04L 5/005 |
| | | | | 370/329 |
| 2019/0372727 A1* | 12/2019 | Joseph | ................ | H04L 27/2613 |
| 2019/0394765 A1* | 12/2019 | Saxena | ................. | H04W 72/51 |
| 2020/0169995 A1* | 5/2020 | Nam | .................... | H04W 72/21 |
| 2020/0194904 A1* | 6/2020 | Huh | ...................... | H01Q 21/24 |
| 2020/0195336 A1* | 6/2020 | Raghavan | ............ | H04B 7/0617 |
| 2020/0204242 A1* | 6/2020 | Zhou | .................... | H04W 72/21 |
| 2020/0265642 A1* | 8/2020 | Murching | ............... | G06F 9/451 |
| 2021/0351829 A1* | 11/2021 | Kakishima | ............ | H04W 16/28 |

* cited by examiner

FIG. 10

Table 1000:

| Physical parameter(s) 1010 | | | Operational parameter(s) 1020 | | | | State code 1030 |
|---|---|---|---|---|---|---|---|
| Separation | Orientation | Electrical distance | Attenuation | UL-PRS | DL-PRS | En/dis ant(s)/AE(s) | |
| AE1, AE2, Sep X ← 1050 | AE1, AE2, O(23°, 47°) | | | | | | |
| | | AE1, Pos unit, 4.7λ ← 1060 | AE1, 18dB | FL1, SCS2, offset2, etc. | FL2, SCS1, offset2, etc. | | PS13 |
| | | | | | | AE1 disabled | PS7 |

FIG. 11

Table 1100:

| Physical parameter(s) 1110 | | | Operational parameter(s) 1120 | |
|---|---|---|---|---|
| Separation change | Orientation change | Electrical distance change | Attenuation change | Enabled/disabled antenna(s)/antenna element(s) |
| AE1, AE2, Sep ΔA | AE1, AE2, O(-7°, 18°) | | | AE1 disabled |
| | | AE1, Pos unit, -0.8λ | AE1, 2.3dB | |

| Radiation pattern | | Timing | State code |
|---|---|---|---|
| Angles | Gains | | |
| A11, A12, ..., A1N | G11, G12, ..., G1N | T1 | PS1 |
| A21, A22, ..., A2N | G21, G22, ..., G2N | T2 | PS2 |
| A31, A32, ..., A3N | G31, G32, ..., G3N | T3 | PS3 |

FIG. 19

| Antenna system characteristics | | | | | | State code |
|---|---|---|---|---|---|---|
| Main beam | | Side lobe | | Side lobe | | |
| Angle | Gain, BW (e.g., 3dB) | Angle | Gain, BW (e.g., 3dB) | Angle | Gain, BW (e.g., 3dB) | |
| 0 | 0, 14 | -28 | -12, 6 | -82 | -15, 9 | PS1 |
| 9 | 0, 15 | -37 | -7, 6 | -73 | -5, 9 | PS2 |
| 9 | 0, 16 | -37 | -1.5, 5 | -73 | -3, 7 | PS3 |

FIG. 20

| Antenna system characteristics | | | | | |
|---|---|---|---|---|---|
| Main beam | | Side lobe | | Side lobe | |
| Angle | Gain, BW (e.g., 3dB) | Angle | Gain, BW (e.g., 3dB) | Angle | Gain, BW (e.g., 3dB) |
| 0 | 0, 14 | -28 | -12, 6 | -82 | -15, 9 |
| 9 | 0, 1 | -9 | 5, 0 | 9 | 10, 0 |
| 9 | 0, 2 | -9 | 10.5, -1 | 9 | 12, -2 |

FIG. 21

| Radiation pattern | | Frequency | Timing | State code |
|---|---|---|---|---|
| Angles | Gains | | | |
| A111, A112, ..., A11N | G111, G112, ..., G11N | F1 | T1 | PS1 |
| A121, A122, ..., A12N | G1212, G122, ..., G12N | F2 | T2 | PS1 |
| A211, A212, ..., A21N | G211, G212, ..., G21N | F1 | T3 | PS2 |
| A231, A232, ..., A23N | G231, G232, ..., G23N | F3 | T2 | PS2 |
| A321, A322, ..., A32N | G321, G322, ..., G32N | F2 | T3 | PS3 |

FIG. 22

| Beam weights | Frequency of operation | Inter-antenna-element spacing | Inter-antenna-system orientation | Inter-antenna-system electrical separation | State code |
|---|---|---|---|---|---|
| W1, W2 | F3 | AS1, Sp1; AS2, Sp2 | AS1/AS2, O1° | AS1/AS2, FR1: Sep1<br>AS1/AS2, FR2: Sep2 | S1 |
| W3 | F2 | AS1, Sp1; AS2, Sp3 | AS1/AS2, O2° | AS1/AS2, FR1: Sep3<br>AS1/AS2, FR2: Sep4 | S2 |

FIG. 23

DYNAMIC ANTENNA RADIATION PATTERN NOTIFICATION

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

A device may change form factor, and such change may affect one or more operational parameters of the device. For example, a device with moving parts and/or that can be folded or flexed may have different antenna performance in different physical configurations.

SUMMARY

An example UE (user equipment) includes: a transceiver including a first antenna element and a second antenna element, where the UE is configured to allow changing of a physical relationship between the first antenna element and another component of the UE between a first state and a second state, the physical relationship between the first antenna element and the other component of the UE being different in the first state and the second state; a memory; and a processor communicatively coupled to the transceiver, the memory, and the positioning unit and configured to: determine that the physical relationship between the first antenna element and the other component of the UE has changed from the first state; and provide at least one notification in response to determining that the physical relationship between the first antenna element and the other component of the UE has changed from the first state.

Implementations of such a UE may include one or more of the following features. To provide the at least one notification the processor is configured to send a first notification to a positioning unit of the UE that is configured to determine a position of the UE, or to send a second notification to a network entity via the transceiver, or a combination thereof. To determine that the physical relationship between the first antenna element and the other component of the UE has changed from the first state the processor is configured to determine whether a separation between the first antenna element and the second antenna element of the transceiver has changed, or to determine whether an orientation of the first antenna element relative to the second antenna element has changed, or a combination thereof. The at least one notification indicates that the physical relationship between the first antenna element and the other component of the UE has changed. The at least one notification indicates: a present separation between the first antenna element and the second antenna element of the transceiver has changed; or a present orientation of the first antenna element relative to the second antenna element; or a change in separation between the first antenna element and the second antenna element; or a change in orientation of the first antenna element relative to the second antenna element; or that the first antenna element is disabled; or that the second antenna element is enabled; or a downlink positioning reference signal configuration; or an uplink positioning reference signal configuration; or one or more calibration parameters associated with an electrical distance between the first antenna element and the other component of the UE; or any combination thereof.

Also or alternatively, implementations of such a UE may include one or more of the following features. The at least one notification is at least one initial notification that indicates a default condition, and where the processor is further configured to provide at least one further notification indicating that a present physical relationship between the first antenna element and the other component of the UE is in the second state. The processor is configured to provide the at least one further notification in response to determining that the physical relationship between the first antenna element and the other component of the UE has been in the second state for at least a threshold amount of time. The processor is configured to receive an indication of the threshold amount of time via the transceiver from a network entity.

Also or alternatively, implementations of such a UE may include one or more of the following features. The at least one notification is at least one initial notification, and the processor is further configured to provide at least one further notification in response to determining that the physical relationship between the first antenna element and the other component of the UE has returned to the first state and that the physical relationship has been in the first state, after returning to the first state, for at least a threshold amount of time. The processor is further configured to send a capability message, to a network entity via the transceiver, indicating a plurality of configurations each corresponding to different physical relationships between the first antenna element and the other component of the UE. The processor is configured to provide a configuration indication of one or more configuration parameters to be used by the UE until indicated otherwise by the processor.

An example method at a UE for responding to a change in physical state of the UE includes: determining that a physical relationship between a first antenna element of the UE and another component of the UE has changed from a first state; and providing at least one notification in response to determining that the physical relationship between the first antenna element and the other component of the UE has changed from the first state.

Implementations of such a method may include one or more of the following features. Providing the at least one notification includes sending a first notification to a positioning unit of the UE that is configured to determine a position of the UE, or sending a second notification to a network entity from the UE, or a combination thereof. Determining that the physical relationship between the first antenna element and the other component of the UE has changed from the first state includes determining whether a separation between the first antenna element and a second antenna element has changed, or determining whether an orientation of the first antenna element relative to the second antenna element has changed, or a combination thereof. The at least one notification indicates that the physical relationship between the first antenna element and the other component of the UE has changed. The at least one notification indicates: a present separation between the first antenna element and a second antenna element has changed; or a present orientation of the first antenna element relative to the second antenna element; or a change in separation between the first antenna element and the second antenna element; or a change in orientation of the first antenna element relative to the second antenna element; or that the first antenna element is disabled; or that the second antenna element is enabled; or a downlink positioning reference signal configuration; or an uplink positioning reference signal configuration; or one or more calibration parameters associated with an electrical distance between the first antenna element and the other component of the UE; or any combination thereof.

Also or alternatively, implementations of such a method may include one or more of the following features. The at least one notification is at least one initial notification that indicates a default condition, and the method includes providing at least one further notification indicating that a present physical relationship between the first antenna element and the other component of the UE is in a second state that is different from the first state. The at least one further notification is provided in response to determining that the physical relationship between the first antenna element and the other component of the UE has been in the second state for at least a threshold amount of time. The method includes receiving, at the UE from a network entity, an indication of the threshold amount of time.

Also or alternatively, implementations of such a method may include one or more of the following features. The at least one notification is at least one initial notification, and the method includes providing at least one further notification in response to determining that the physical relationship between the first antenna element and the other component of the UE has returned to the first state and that the physical relationship has been in the first state, after returning to the first state, for at least a threshold amount of time. The method includes sending a capability message, to a network entity from the UE, indicating a plurality of configurations each corresponding to different physical relationships between the first antenna element and the other component of the UE. The method includes providing a configuration indication of one or more configuration parameters to be used by the UE until indicated otherwise by the UE.

Another example UE includes: means for determining that a physical relationship between a first antenna element of the UE and another component of the UE has changed from a first state; and means for providing at least one notification in response to determining that the physical relationship between the first antenna element and the other component of the UE has changed from the first state.

Implementations of such a UE may include one or more of the following features. The means for providing the at least one notification include means for sending a first notification to a positioning unit of the UE that is configured to determine a position of the UE, or means for sending a second notification to a network entity from the UE, or a combination thereof. The means for determining that the physical relationship between the first antenna element and the other component of the UE has changed from the first state include means for determining whether a separation between the first antenna element and a second antenna element has changed, or means for determining whether an orientation of the first antenna element relative to the second antenna element has changed, or a combination thereof. The at least one notification indicates that the physical relationship between the first antenna element and the other component of the UE has changed. The at least one notification indicates: a present separation between the first antenna element and a second antenna element has changed; or a present orientation of the first antenna element relative to the second antenna element; or a change in separation between the first antenna element and the second antenna element; or a change in orientation of the first antenna element relative to the second antenna element; or that the first antenna element is disabled; or that the second antenna element is enabled; or a downlink positioning reference signal configuration; or an uplink positioning reference signal configuration; or one or more calibration parameters associated with an electrical distance between the first antenna element and the other component of the UE; or any combination thereof.

Also or alternatively, implementations of such a UE may include one or more of the following features. The at least one notification is at least one initial notification that indicates a default condition, and the UE includes means for providing at least one further notification indicating that a present physical relationship between the first antenna element and the other component of the UE is in a second state that is different from the first state. The means for providing the at least one further notification include means for providing the at least one further notification in response to determining that the physical relationship between the first antenna element and the other component of the UE has been in the second state for at least a threshold amount of time. The UE includes means for receiving, from a network entity, an indication of the threshold amount of time.

Also or alternatively, implementations of such a UE may include one or more of the following features. The at least one notification is at least one initial notification, and the UE includes means for providing at least one further notification in response to determining that the physical relationship between the first antenna element and the other component of the UE has returned to the first state and that the physical relationship has been in the first state, after returning to the first state, for at least a threshold amount of time. The UE includes means for sending a capability message, to a network entity, indicating a plurality of configurations each corresponding to different physical relationships between the first antenna element and the other component of the UE. The UE includes means for providing a configuration indication of one or more configuration parameters to be used by the UE until indicated otherwise by the UE.

An example non-transitory, processor-readable storage medium includes processor-readable instructions to cause a processor of a UE, in order to respond to a change in physical relationship of the UE, to: determine that a physical relationship between a first antenna element of the UE and another component of the UE has changed from a first state; and provide at least one notification in response to determining that the physical relationship between the first antenna element and the other component of the UE has changed from the first state.

Implementations of such a storage medium may include one or more of the following features. The processor-readable instructions to cause the processor to provide the at least one notification include processor-readable instructions to cause the processor to send a first notification to a positioning unit of the UE that is configured to determine a position of the UE, or send a second notification to a network entity, or a combination thereof. The processor-readable instructions to cause the processor to determine that the physical relationship between the first antenna element and the other component of the UE has changed from the first state include processor-readable instructions to cause the processor to determine whether a separation between the first antenna element and a second antenna element has changed, or determining whether an orientation of the first antenna element relative to the second antenna element has changed, or a combination thereof. The at least one notification indicates that the physical relationship between the first antenna element and the other component of the UE has changed. The at least one notification indicates: a present separation between the first antenna element and a second antenna element has changed; or a present orientation of the first antenna element relative to the second antenna element; or a change in separation between the first antenna element and the second antenna element; or a change in orientation of the first antenna element relative to the second antenna element; or that the first antenna element is disabled; or that the second antenna element is enabled; or a downlink positioning reference signal configuration; or an uplink positioning reference signal configuration; or one or more calibration parameters associated with an electrical distance between the first antenna element and the other component of the UE; or any combination thereof.

Also or alternatively, implementations of such a storage medium may include one or more of the following features. The at least one notification is at least one initial notification that indicates a default condition, and the storage medium includes processor-readable instructions to cause the processor to provide at least one further notification indicating that a present physical relationship between the first antenna element and the other component of the UE is in a second state that is different from the first state. The processor-readable instructions to cause the processor to provide the at least one further notification include processor-readable instructions to cause the processor to provide the at least one further notification in response to determining that the physical relationship between the first antenna element and the other component of the UE has been in the second state for at least a threshold amount of time. The storage medium includes processor-readable instructions to cause the processor to receive, from a network entity, an indication of the threshold amount of time.

Also or alternatively, implementations of such a storage medium may include one or more of the following features. The at least one notification is at least one initial notification, and the storage medium includes processor-readable instructions to cause the processor to provide at least one further notification in response to determining that the physical relationship between the first antenna element and the other component of the UE has returned to the first state and that the physical relationship has been in the first state, after returning to the first state, for at least a threshold amount of time. The storage medium includes processor-readable instructions to cause the processor to send a capability message, to a network entity, indicating a plurality of configurations each corresponding to different physical relationships between the first antenna element and the other component of the UE. The storage medium includes processor-readable instructions to cause the processor to provide a configuration indication of one or more configuration parameters to be used by the UE until indicated otherwise by the UE.

Another example UE includes: a body that is movable to a plurality of physical states having different physical arrangements; a transceiver including an antenna system comprising at least one antenna element; a memory; and a processor communicatively coupled to the transceiver and the memory and configured to transmit one or more antenna system characteristics via the transceiver based on change of the body from a first physical state of the plurality of physical states to a second physical state of the plurality of physical states.

An example method at a UE for indicating change in physical state of the UE includes: determining a change of the UE from a first physical state of a plurality of physical states to a second physical state of the plurality of physical states; and transmitting one or more antenna system characteristics, corresponding to an antenna system of the UE, based on determining the change of the UE from the first physical state of the plurality of physical states to the second physical state of the plurality of physical states.

Another example UE includes: means for determining a change of the UE from a first physical state of a plurality of physical states to a second physical state of the plurality of physical states; and means for transmitting one or more antenna system characteristics, corresponding to an antenna system of the UE, based on determining the change of the UE from the first physical state of the plurality of physical states to the second physical state of the plurality of physical states.

Another example non-transitory, processor-readable storage medium includes processor-readable instructions to cause a processor of a UE to: determine a change of the UE from a first physical state of a plurality of physical states to a second physical state of the plurality of physical states; and transmit one or more antenna system characteristics, corresponding to an antenna system of the UE, based on determining the change of the UE from the first physical state of the plurality of physical states to the second physical state of the plurality of physical states.

BRIEF DESCRIPTION OF THE DRAWINGS

FIG. 10 is an example of a user equipment physical state notification.

FIG. 11 is an example of a user equipment physical state notification that includes parameter value delta indications.

FIG. 19 is a simplified notification of radiation patterns for different physical states of the device shown in FIG. 15.

FIG. 20 is a simplified notification of properties of radiation patterns for different physical states of the device shown in FIG. 15.

FIG. 21 is a simplified notification, of differential values, of properties of radiation patterns for different physical states of the device shown in FIG. 15.

FIG. 22 is a simplified notification of radiation patterns for different physical states, and different frequencies of operation, of the device shown in FIG. 15.

FIG. 23 is a simplified notification of antenna characteristics for different states of the device shown in FIG. 15.

DETAILED DESCRIPTION

Figure 1:
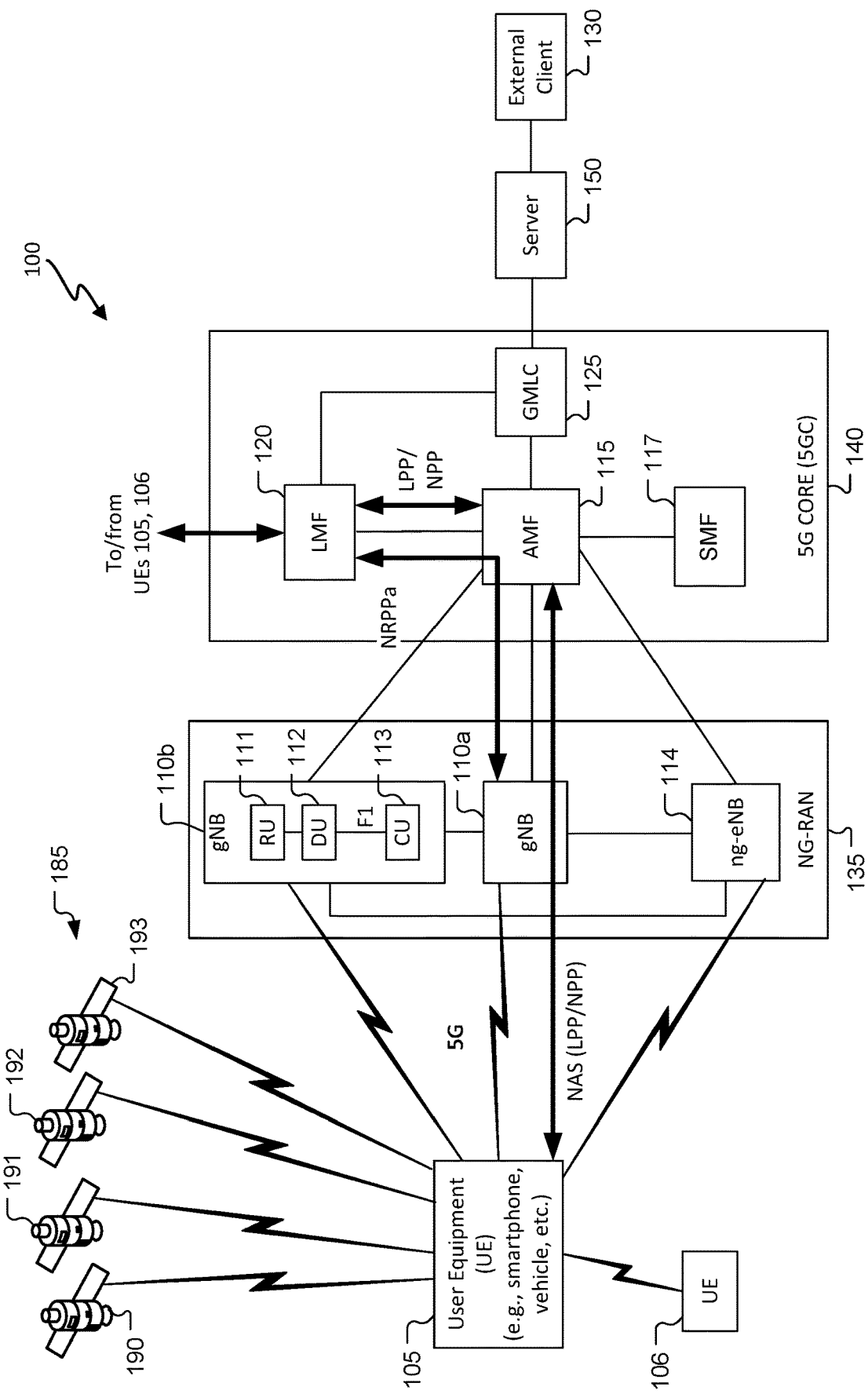
FIG. 1 is a simplified diagram of an example wireless communications system.

Techniques are discussed herein for responding to changes in physical states of a user equipment (UE). For example, changes in physical relationships of antenna elements of the UE may be determined and reported internally (e.g., to a positioning unit of the UE) and/or externally (e.g., to a network entity). The notification(s) of the physical changes may include one or more direct and/or indirect (e.g., coded) indications of physical parameters describing the physical relationship(s) of the UE and/or one or more operational parameter(s) of and/or desired by the UE corresponding to the physical relationship(s). The notification(s) may indicate one or more antenna system characteristics, such as radiation pattern, for different physical states of the UE. Antenna system characteristics and/or sets of antenna system characteristics may be established each corresponding to multiple physical states of the UE. One or more antenna system characteristics for one physical state of the UE may be indicated with differential values relative to one or more reference antenna system characteristics. These are examples, and other examples may be implemented.

Items and/or techniques described herein may provide one or more of the following capabilities, as well as other capabilities not mentioned. Energy may be saved by avoiding processing or attempted processing of signals under conditions of poor performance (e.g., poor transmission and/or reception of signals). Signal exchange may be improved by adjusting signal configurations in accordance with changing UE capability(ies). Position information (e.g., position estimate) accuracy may be improved, e.g., by accounting for physical state changes of a UE on signal exchange (e.g., signal reception and/or transmission timing). Accuracy of determination of angle of an entity relative to a UE, and/or vice versa, may be improved. Such angle estimation is useful in many user applications that rely on accurate position or angle estimation. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more BSs, e.g., one or more of the gNBs 110a, 110b and/or the ng-eNB 114 may be configured to communicate with the UE 105 via multiple carriers. Each of the gNBs 110a, 110b and the ng-eNB 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller)

number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110a, 110b, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110a, 110b, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g. the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The gNBs 110*a*, 110*b* and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110*a*, 110*b* and/or the ng-eNB 114 may include a radio unit (RU), a distributed unit (DU), and a central unit (CU). For example, the gNB 110*a* includes an RU 111, a DU 112, and a CU 113. The RU 111, DU 112, and CU 113 divide functionality of the gNB 110*a*. While the gNB 110*a* is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110*a*. The DU 112 hosts the Radio Link Control (RLC), Medium Access Control (MAC), and physical layers of the gNB 110*a*. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110*a*. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110*a*, 110*b* and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g. by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110*a*, 110*b* (e.g., via the RU 111, the DU 112, and the CU 113) and/or the ng-eNB 114, and/or the LMF 120. As another example, the UE 105, one or more of the gNBs 110*a*, 110*b* (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS transmissions from the gNBs 110*a*, 110*b*, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
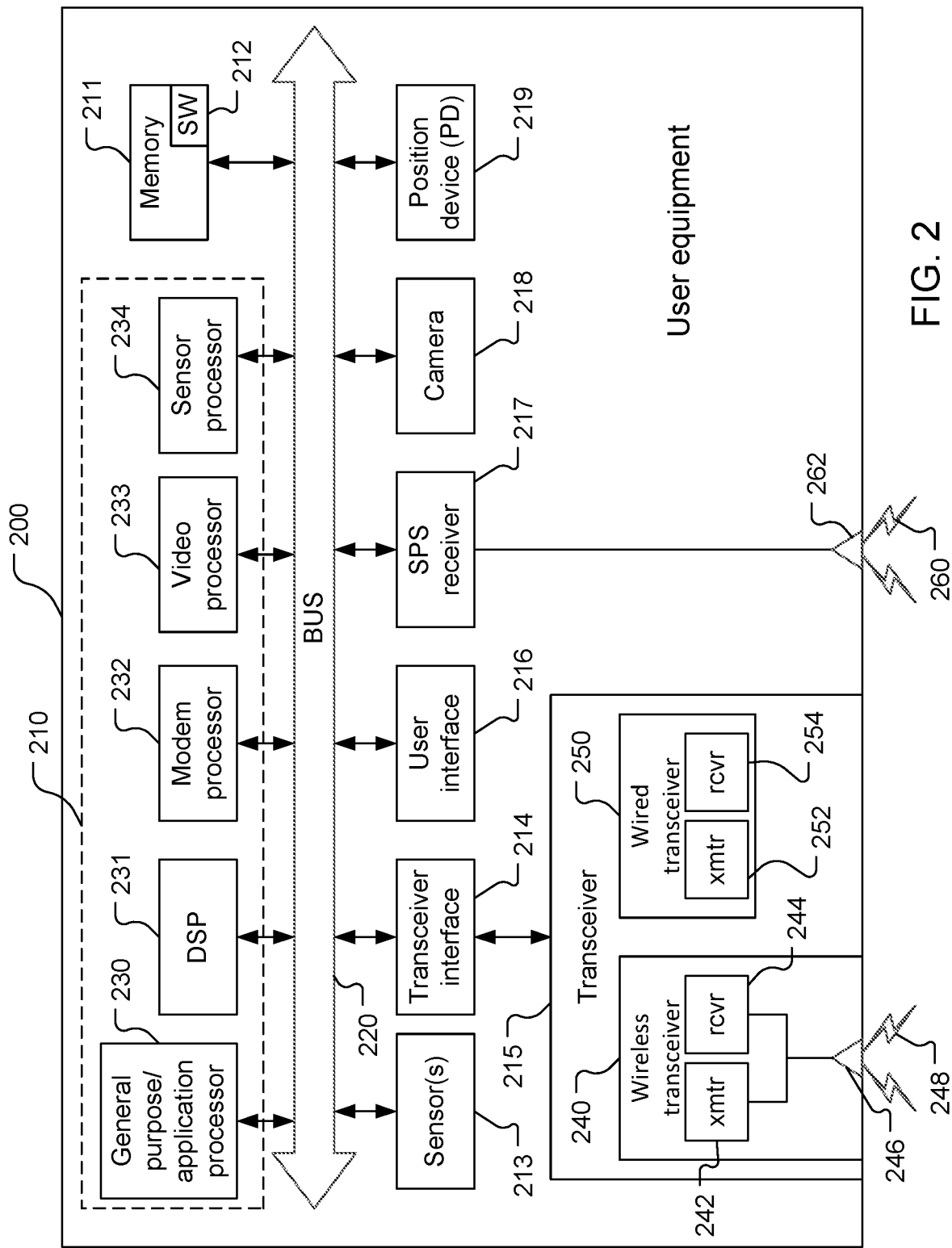
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general purpose/application processor 230, the transceiver 215, the SPS receiver 217, and/or another component of the UE 200, and may be provided by hardware, software, firmware, or various combinations thereof.

Figure 3:
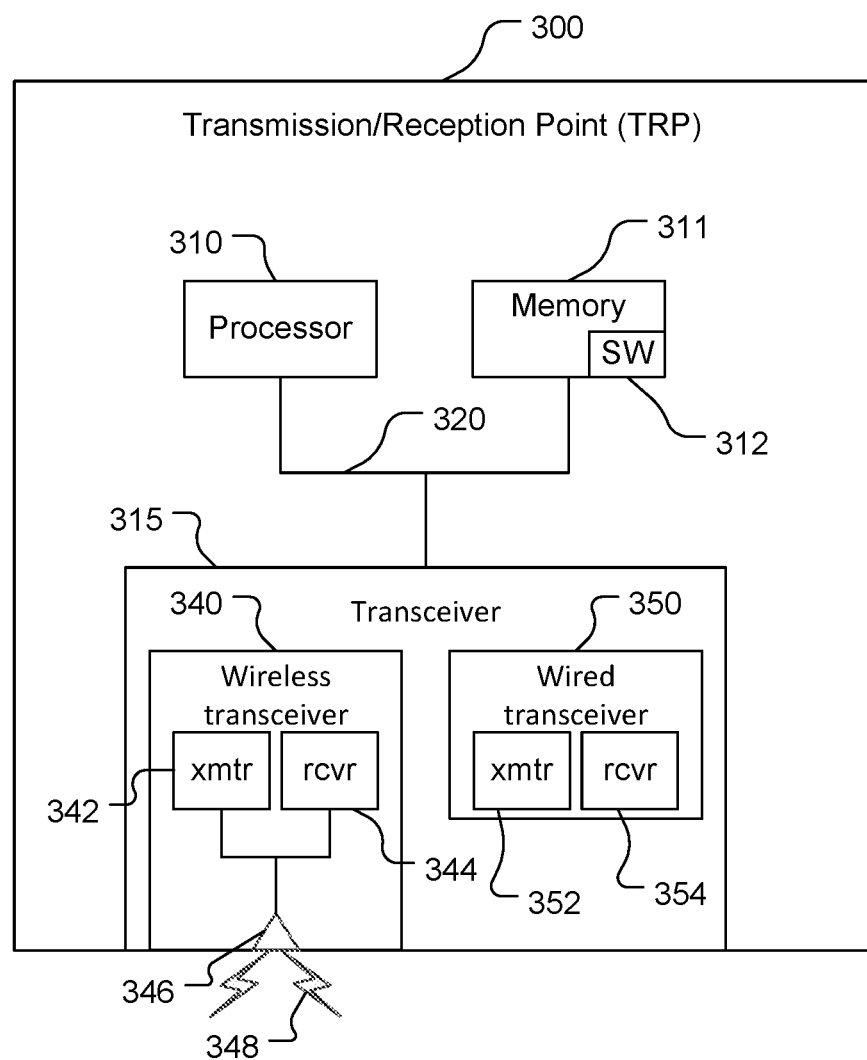
FIG. 3 is a block diagram of components of an example transmission/reception point shown in FIG. 1.

Referring also to FIG. 3, an example of a TRP 300 of the gNBs 110a, 110b and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the gNBs 110a, 110b and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
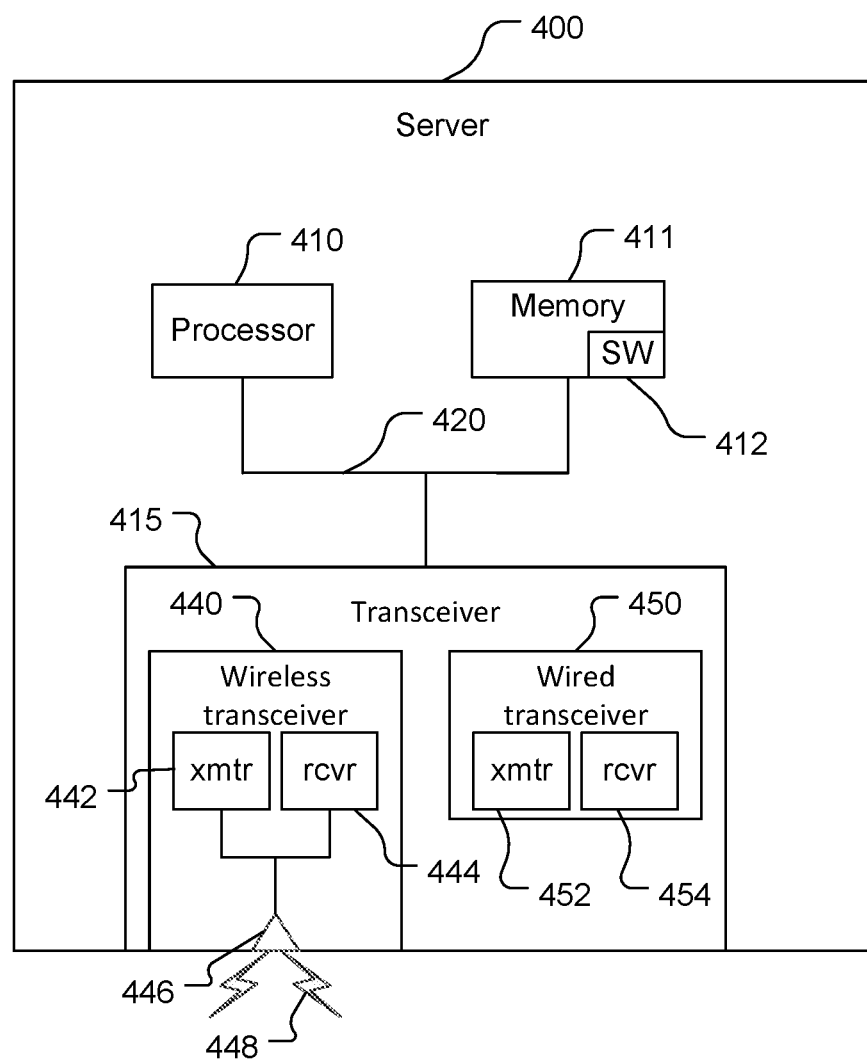
FIG. 4 is a block diagram of components of an example server shown in FIG. 1.

Referring also to FIG. 4, a server 400, of which the LMF 120 is an example, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \to Tx}$ (i.e., UE $T_{Rx-Tx}$ or $UE_{Rx-Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \to Rx}$ between the transmission time of the RTT measurement signal from the base station and the ToA of the RTT response at the base station to the UE-reported time difference $T_{Rx \to Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS, CSI-RS ((Channel State Information-Reference Signal)), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., by modulating a carrier signal with the PN code) such that a source of the PRS may serve as a pseudo-satellite (a pseudolite). The PN code may be unique to the PRS source (at least within a specified area such that identical PRS from different PRS sources do not overlap). PRS may comprise PRS resources or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRS-Resource-Set, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple Resource Elements (REs) that may be in multiple Resource Blocks (RBs) within N (one or more) consecutive symbol(s) within a slot. An RB is a collection of REs spanning a quantity of one or more consecutive symbols in the time domain and a quantity (12 for a 5G RB) of consecutive subcarriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Stitching comprises combining PRS measurements over individual bandwidth fragments into a unified piece such that the stitched PRS may be treated as having been taken from a single measurement. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning signals being sent by UEs, and with PRS and SRS for positioning signals being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Dynamic Form Factor Devices

Positioning of mobile devices has been of interest for some time in standard specification efforts. Angle-based positioning has traditionally been network based, e.g., DL AoD/ZoD (downlink angle of departure/zenith angle of departure) based or UL AoA/ZoA (uplink angle of arrival/zenith angle of arrival) based. Knowledge of beam shapes and/or patterns used by the TRP 300 for PRS may be transmitted to a (positioning) server, e.g., an LMF, that may transmit this information to a UE. The UE may report reference signal measurements, e.g., RSRP, to the TRP 300 and/or the server 400 and the TRP 300 and/or the server 400 can determine position estimates for the UE.

If the UE can have large antenna arrays/panels and/or more antennas than prior UEs, then angle measurements may be made more accurately at the UE. For example, at FR2 frequencies (24.25 GHz-52.6 GHz), arrays of size 8×8 or 64×16 antenna elements at the TRP 300 may be used while UEs may be limited to arrays of 2×2 or 4×1 antenna elements. At higher frequencies, however, such as FR4 frequencies (e.g., 52.6 GHz-114.25 GHz) (called upper millimeter wave bands or a sub-terahertz regime), more antenna elements may be provided in the same physical aperture than for FR2. For example, a 14 GHz-wide bandwidth of 57 GHz-71 GHz is available in multiple geographic regions (e.g., countries), allowing significant performance/beamforming improvements. Beamforming with large antenna arrays leads to smaller beamwidths, so that UEs, even with small form factors, may provide sufficiently narrow beamwidths to provide accurate AoA or AoD measurements for UE-side positioning. UE-side positioning may be used independently, or to complement network-side (e.g., TRP-based) positioning. By supplementing the measurements available for positioning with UE-based measurements, better position estimation accuracy may be achieved (e.g., averaging of measurements may be able to reduce noise). Diversity of measurements may help reveal discrepancies/inconsistencies with TRP-side measurements.

Dynamic form factor devices are becoming increasingly popular. Dynamic form factor UEs include foldable devices, bendable devices, rollable devices, and devices with moving parts, e.g., Industrial Internet of Things (IIoT) devices such as robots with arms. Changes in form factor may lead to different operational characteristics such as attenuation, antenna radiation pattern (including antenna pattern (for a single antenna element) and/or beam pattern (for multiple antenna elements)), etc. For example, antenna arrays may be separated in one form factor and may remain adjacent to each other in another form factor to effectively provide a larger antenna array. Indications of changes in form factor and/or operational characteristics may be provided from a UE to the network, e.g., to help with UE positioning based on UE-side angle estimation. The assistance information may be particularly relevant to upper millimeter wave bands and UE-side effects due to physical changes of a dynamic form factor device, although the techniques discussed are applicable to other situations as well. Due to the reciprocal property of antenna elements, a receiving radiation pattern is the same as a transmitting radiation pattern, and thus the term radiation pattern is used for transmission or reception of signals. Also, the term radiation pattern as used includes an antenna gain (peak gain of the radiation pattern of a single antenna element) or a beam pattern (the radiation pattern of multiple antenna elements jointly).

Millimeter wave systems (e.g., using 24.25 GHz and higher) may be used for high data rate transmissions in a range of devices such as UEs, customer premises equipment (CPE), etc. Dynamic form factor devices provide new degrees of freedom for physical layer communications. The same device may work in different form factors (e.g., as a mobile phone, a tablet/laptop/notebook, IIoT UEs where the UE could have one or more antenna panels that move, e.g., relative to each other, etc.). Changes in form factor of a device may be predictable, e.g., if the device has a fixed set of possible positions, or a pattern of positions (e.g., in an IIoT scenario). Antenna modules may be shared across different parts of a device.

Figure 5:
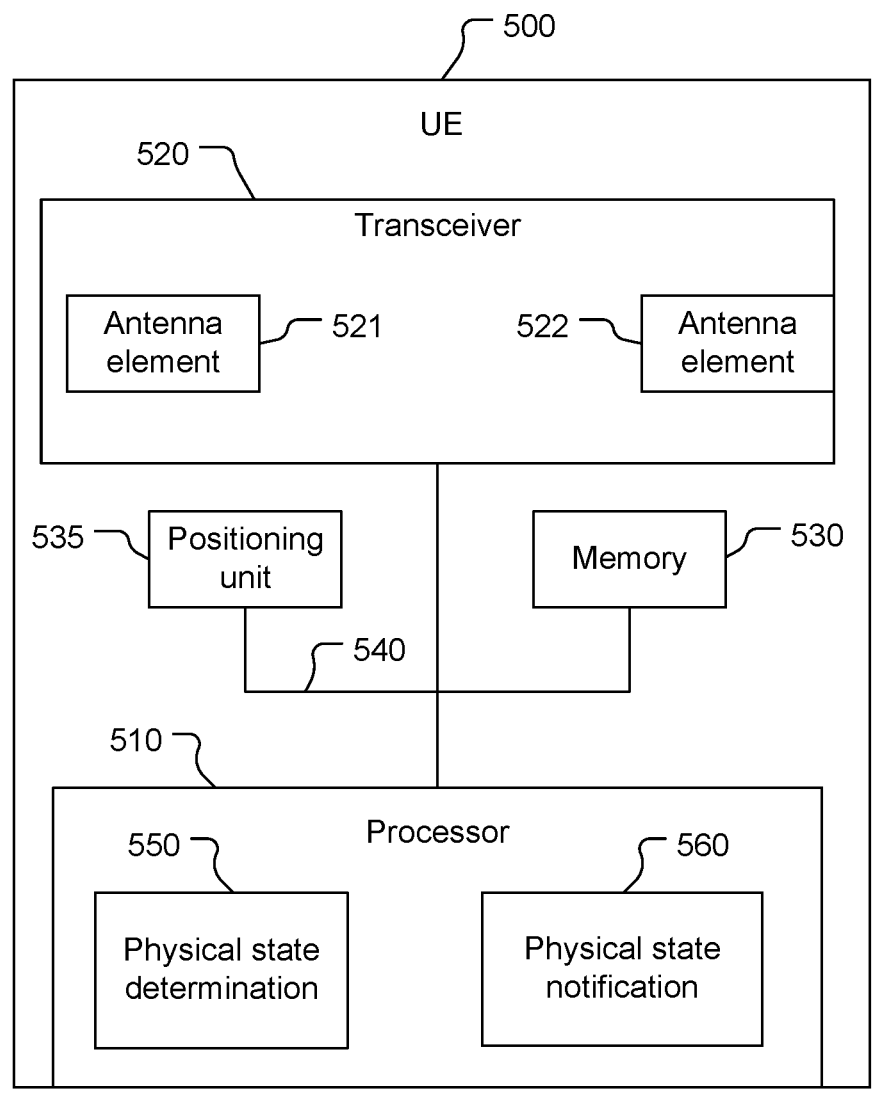
FIG. 5 is a block diagram of an example user equipment.

Referring to FIG. 5, with further reference to FIGS. 1-4, a UE 500 includes a processor 510, a transceiver 520, a memory 530, and a positioning unit 535 communicatively coupled to each other by a bus 540. The UE 500 may be any of a variety of types of devices, e.g., a laptop computer, a tablet computer, a smartphone, Industrial Internet of Things (IIoT) device, etc. The UE 500 may include the components shown in FIG. 5, and may include one or more other components such as any of those shown in FIG. 2 such that the UE 200 may be an example of the UE 500. For example, the processor 510 may include one or more of the components of the processor 210. The transceiver 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the transceiver 520 may include the wired transmitter 252 and/or the wired receiver 254. The memory 530 may be configured similarly to the memory 211, e.g., including software with processor-readable instructions configured to cause the processor 510 to perform functions. The positioning unit 535 is configured to determine a position of the UE 500 and may be part of a modem of the UE 500 and/or may be implemented partially by, or completely by, the processor 510.

The transceiver 520 includes an antenna element 521 and an antenna element 522. The antenna elements 521, 522 may be part of a single antenna or may be parts of respective separate antennas, and may be part of a single antenna panel or parts of respective separate antenna panels. Further, more than two antenna elements may be included in the UE 500 and disposed in one or more antennas. The UE 500 is configured to be physically altered such that a physical relationship of the antenna elements 521, 522 is changed, e.g., such that the location of and/or orientation of the antenna element 522 relative to the antenna element 521 is changed. Thus, the separation of the antenna elements 521, 522 may change. The UE 500 may be, for example, pivotable, rollable, bendable, stretchable, etc. One or both of the antenna elements 521, 522 may perform differently depending on the physical relationship of the antenna elements 521, 522 to each other, e.g., due to one or more affects of one of the antenna elements 521, 522 on the other and/or one or more affects on one or both of the antenna elements 521, 522 due to the physical relationship of one or more other components of the UE 500 changing with respect to one or both of the antenna elements 521, 522. For example, a physical relationship(s) of a display of the UE 500, a housing of the UE 500, and/or one or more electronic components other than the antenna elements 521, 522 relative to one or more of the antenna elements 521, 522 may change as the physical relationship of the antenna elements 521, 522 relative to each other changes and the change(s) of this(these) physical relationship(s) may affect performance of one or both of the antenna elements 521, 522. For example, the housing may block the antenna element 521 more in some physical states of the UE 500 than in others, possibly causing more attenuation of incoming signals to the antenna element 521 and/or to outgoing signals from the antenna element 521.

The description herein may refer to the processor 510 performing a function, but this includes other implementations such as where the processor 510 executes software (stored in the memory 530) and/or firmware. The description herein may refer to the UE 500 performing a function as shorthand for one or more appropriate components (e.g., the processor 510 and the memory 530) of the UE 500 performing the function. The processor 510 (possibly in conjunction with the memory 530 and, as appropriate, the transceiver 520) may include a physical state determination unit 550 and a physical state notification unit 560. The physical state determination unit 550 and the physical state notification unit 560 are discussed further below, and the description may refer to the processor 510 generally, or the UE 500 generally, as performing any of the functions of the physical state determination unit 550 and/or the physical state notification unit 560, and the UE 500 is configured to perform the functionality discussed. One or both of the units 550, 560, or one or more portions thereof, may be implemented in one or more other components of the UE 500, e.g., in the positioning unit 535 (e.g., a modem).

Referring also to FIGS. 6-8, various implementations of the UE 500 are possible. The implementations shown in FIGS. 6-8 are examples and not limiting of the disclosure as numerous other implementations are possible. In each of the implementation, a physical state of the UE 500 may be altered, e.g., by moving one or more portions of the UE 500 relative to one or more other portions of the UE 500 (e.g., pivoting or folding the UE 500, rolling the UE 500, stretching the UE 500, and/or bending the UE 500, etc.). For example, a display and/or one or more other components of the UE 500 may be stretchable and/or bendable etc. such that the UE 500 may be stretchable, bendable, etc.

Figure 6A:
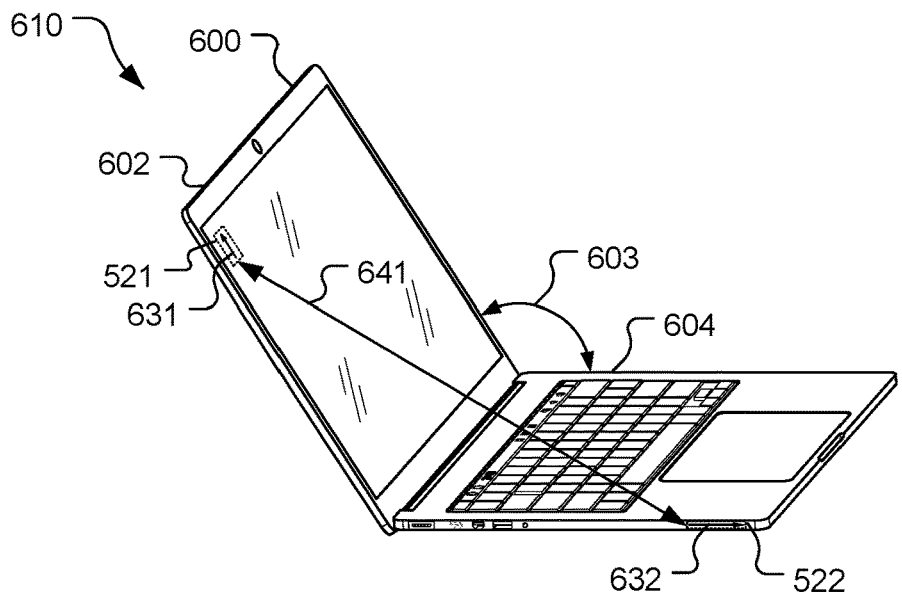
FIG. 6A is a simplified perspective view of a laptop computer in an open state.
Figure 6B:
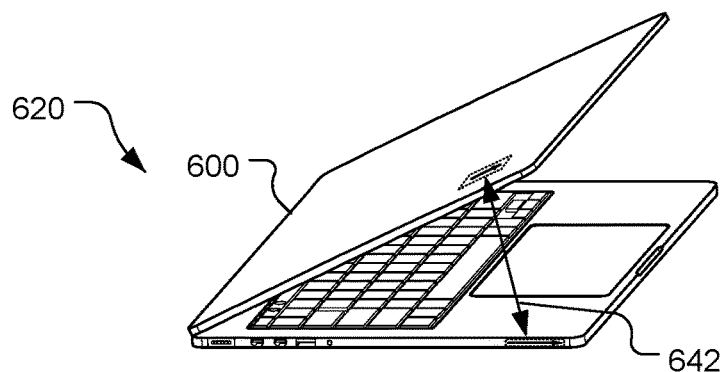
FIG. 6B is a simplified perspective view of the laptop computer, shown in FIG. 6A, in a partially-closed state.
Figure 6C:
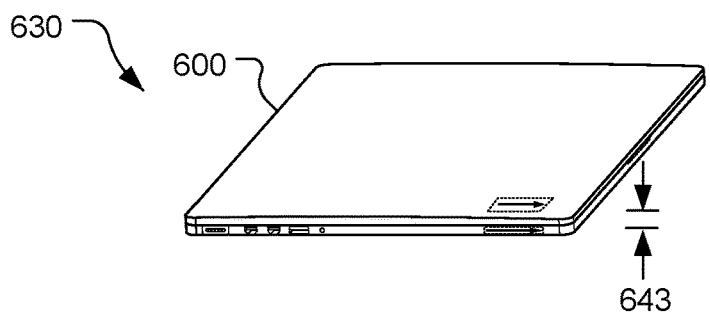
FIG. 6C is a simplified perspective view of the laptop computer, shown in FIG. 6A, in a fully-closed state.

As shown in FIGS. 6A, 6B, 6C, a UE 600 (that is an example of the UE 500) is a laptop computer that includes a top portion 602 and a bottom portion 604, and the antenna elements 521, 522 that have respective orientations 631, 632. The top portion 602 is pivotally connected to the bottom portion 604 to enable the UE 600 to be moved to different physical states by pivoting the portions 602, 604 relative to each other. For example, the UE 600 may be put into a first state 610 shown in FIG. 6A where the UE 600 is open and ready for use, into a second state 620 shown in FIG. 6B, and into a third state 630 shown in FIG. 6C where the UE 600 is closed. The states 610, 620, 630 are examples only and the UE 600 may be put into other physical states, e.g., states between the states 610, 620, states between the states 620, 630, and possibly states where the top portion 602 is pivoted further away from the bottom portion 604 than in the first state 610.

Figure 6D:
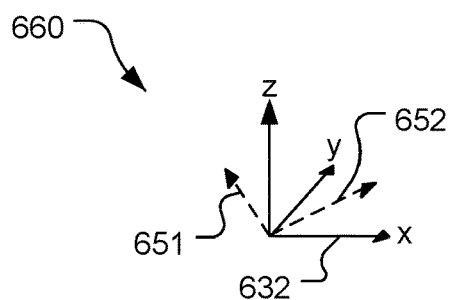
FIG. 6D is a perspective view of a coordinate system and relative orientations of antenna elements, of the laptop computer shown in FIGS. 6A-6C, in the physical states shown in FIGS. 6A-6C.

Referring also to FIG. 6D, in the different states 610, 620, 630, the physical relationship between the antenna elements 521, 522 is different. For example, distances 641, 642, 643 (i.e., separations) between the antenna elements 521, 522 with the UE 600 in the first state 610, the second state 620, and the third state 630, respectively, are different. A relative orientation between the antenna elements 521, 522, i.e., the orientation 631 relative to the orientation 632, is also different in each of the states 610, 620, 630 shown. As shown in FIG. 6D, a coordinate system 660 has the orientation 632 of the antenna element 522 aligned along an x-axis. The orientation 631 of the antenna element 521 in the state 610 is shown by a line 651, and the orientation 631 of the antenna element 521 in the state 620 is shown by a line 652. The orientation 631 of the antenna element 521 in the state 630 is aligned with the orientation 632.

Figure 7A:
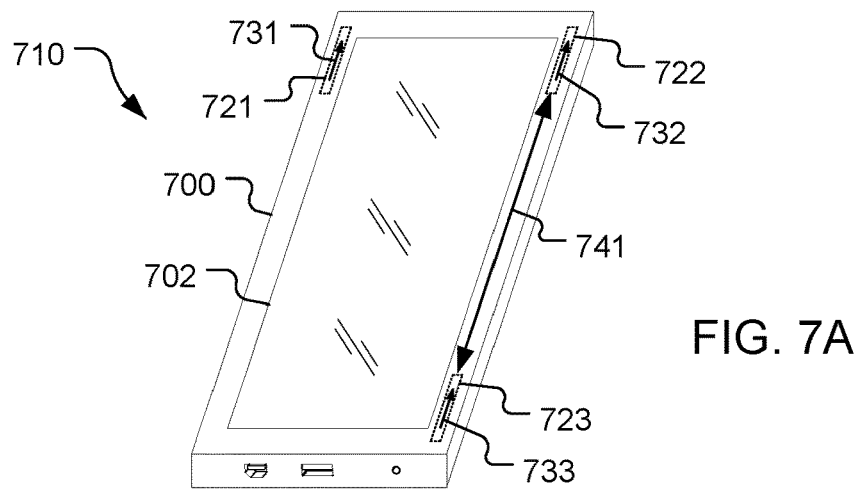
FIG. 7A is a simplified perspective view of a flexible tablet computer in an open state.
Figure 7B:
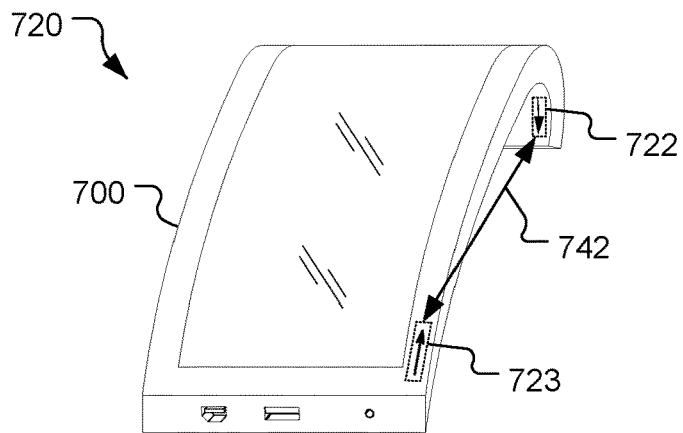
FIG. 7B is a simplified perspective view of the flexible tablet computer, shown in FIG. 6A, in a partially-rolled state.
Figure 7C:
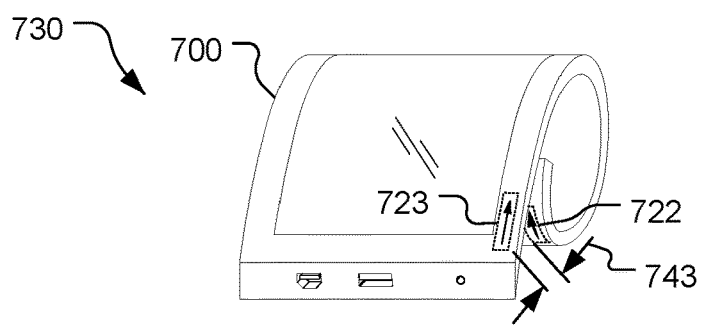
FIG. 7C is a simplified perspective view of the flexible tablet computer, shown in FIG. 6A, in a fully-rolled state.

As shown in FIGS. 7A, 7B, 7C, a UE 700 (that is another example of the UE 500) is a flexible (bendable/rollable) tablet computer that includes a display 702, and antenna elements 721, 722, 723. The antenna elements 721, 722, 723 have respective orientations 731, 732, 733. The UE 700 is configured to be moved to different physical states by flexing the UE 700, in this example by rolling the UE 700. For example, the UE 700 may be put into a first state 710 shown in FIG. 7A where the UE 700 is open and ready for use, into a second state 720 shown in FIG. 7B where the UE 700 is partially rolled up, and into a third state 730 shown in FIG. 7C where the UE 700 is rolled up such that the UE 700 forms more than one full 360° roll. The states 710, 720, 730 are examples only and the UE 700 may be put into other physical states, e.g., states between the states 710, 720, states between the states 720, 730, and possibly states where the UE 700 is rolled up further than in the state 730.

Figure 7D:
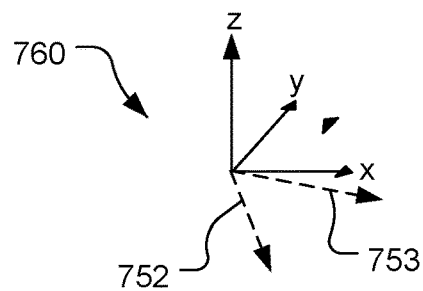
FIG. 7D is a perspective view of a coordinate system and relative orientations of antenna elements, of the flexible tablet computer shown in FIGS. 7A-7C, in the physical states shown in FIGS. 7A-7C.

In the different states 710, 720, 730, the physical relationship between the antenna elements 722, 723 is different (as well as between the antenna elements 721, 723 although the antenna element 721 is not shown in states 720, 730 shown in FIGS. 7B and 7C). For example, distances 741, 742, 743 (i.e., separations) between the antenna elements 722, 723 with the UE 700 in the first state 710, the second state 720, and the third state 730, respectively, are different. A relative orientation between the antenna elements 722, 723, i.e., the orientation 732 relative to the orientation 733, is also different in each of the states 710, 720, 730 shown. As shown in FIG. 7D, a coordinate system 760 has the orientation 733 of the antenna element 723 aligned along a y-axis. The orientation 732 of the antenna element 722 in the state 710 is also aligned along the y-axis. The orientation 732 of the antenna element 722 in the state 720 is shown by a line 752, and the orientation 732 of the antenna element 722 in the state 730 is shown by a line 753. The orientation 631 of the antenna element 521 in the state 630 is aligned with the orientation 632.

Figure 8A:
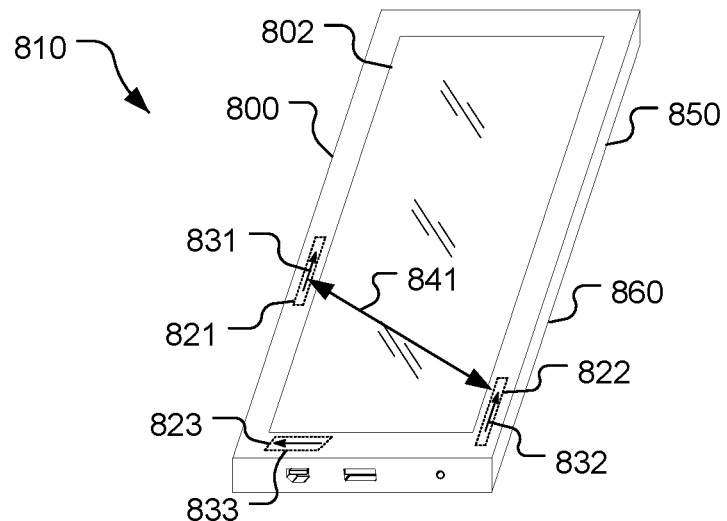
FIG. 8A is a simplified perspective view of a flexible tablet computer in an open state.
Figure 8B:
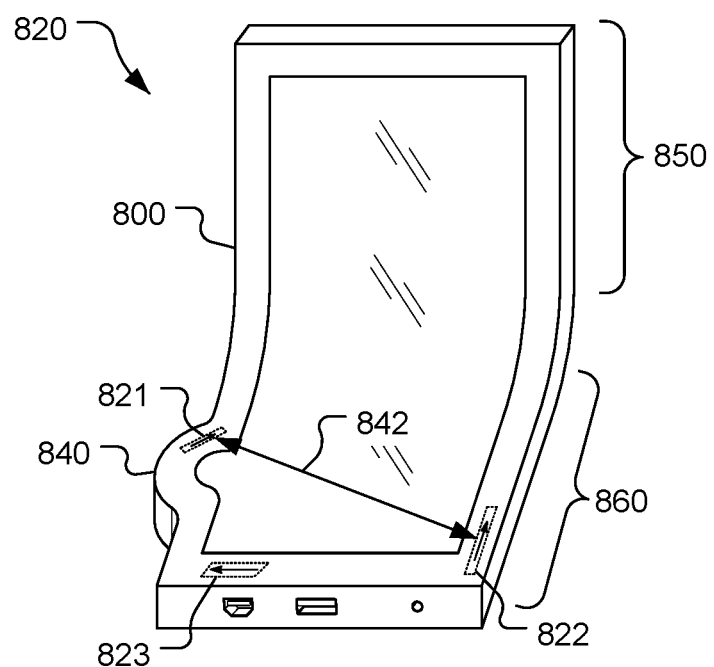
FIG. 8B is a simplified perspective view of the flexible tablet computer, shown in FIG. 8A, in a partially-stretched, and partially-bent state.

As shown in FIGS. 8A, 8B, a UE 800 (that is another example of the UE 500) is a flexible (bendable/rollable/stretchable) tablet computer that includes a display 802, and antenna elements 821, 822, 823. The antenna elements 821, 822, 823 have respective orientations 831, 832, 833. The UE 800 is configured to be moved to different physical states by flexing the UE 800, in this example by stretching and bending the UE 800. For example, the UE 800 may be put into a first state 810 shown in FIG. 8A where the UE 800 is open, flat, and ready for use, and into a second state 820 shown in FIG. 8B where the UE 800 has one side stretched outwardly into a bulge 840, and an upper portion 850 of the UE 800 bent toward a lower portion 860 of the UE 800 partially rolled up. The states 810, 820 are examples only and the UE 700 may be put into other physical states, e.g., states between the states 810, 820, possibly states where the UE 800 is bent further, and states where other stretching of the UE 800 has been done, a side being stretched into a non-linear (e.g., wavy), etc.

In the different states 810, 820, the physical relationships between the antenna elements 821, 822, 823 are different. For example, distances 841, 842 (i.e., separations) between the antenna elements 821, 822 with the UE 800 in the first state 810 and the second state 820, respectively, are different. Distances between the antenna elements 821, 823, and between the antenna elements 822, 823 may also be different, but are not labeled for sake of simplicity of the figures. Relative orientations between the antenna elements 821, 822, 823, i.e., the orientation 831 relative to the orientation 832 and/or to the orientation 833, and the orientation 832 relative to the orientation 833, are also different in each of the states 810, 820 shown.

Figure 9A:
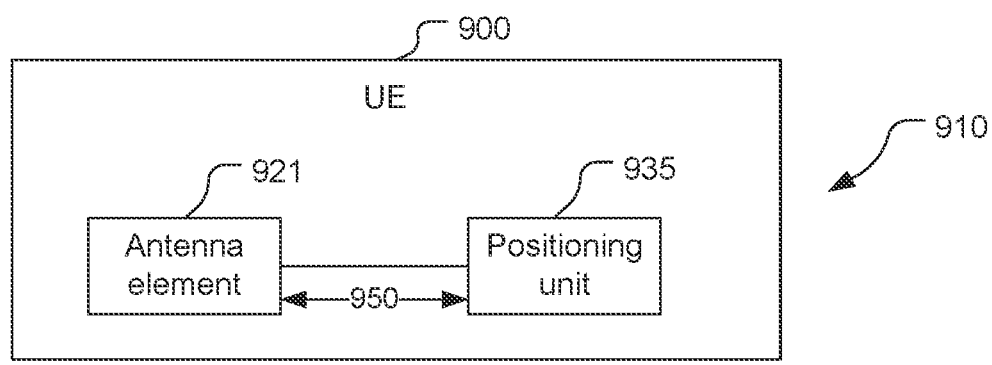
FIG. 9A is a simplified block diagram of an antenna element and a positioning unit of the user equipment shown in FIG. 5 with an electrical distance between the antenna element and the positioning unit.
Figure 9B:
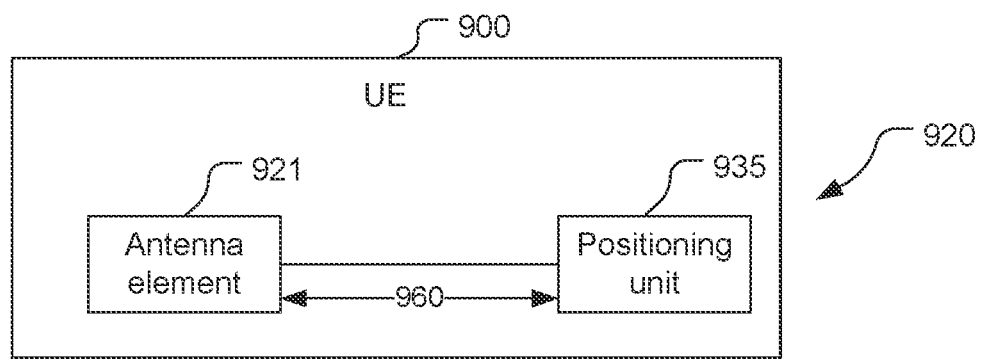
FIG. 9B is a simplified block diagram of the antenna element and the positioning unit shown in FIG. 9A with a different electrical distance between the antenna element and the positioning unit than shown in FIG. 9A.

Referring also to FIGS. 9A and 9B, different physical states of UEs may result in different internal physical relationships of components in addition to and/or instead of different physical relationships between antenna elements. For example, as a UE 900 is changed between a physical state 910 and a physical state 920, an electrical distance between an antenna element 921 and a positioning unit 935 (which may be an example of the positioning unit 535) may change (whether or not a physical distance between the antenna element 921 and the positioning unit 935 are different in the two states 910, 920). In this example, an electrical distance 950 between the antenna element 921 and the positioning unit 935 (e.g., a modem) in the state 910 is shorter than an electrical distance 960 between the antenna element 921 and the positioning unit 935 in the state 920. A change in electrical distance may be achieved, for example, by a transmission line forming at least a portion of a connection between the antenna element 921 and the positioning unit 935 lengthening or shortening between physical states of the UE 900. Also or alternatively, a change in electrical distance may be achieved by changing an electrical location of a connection point to a transmission line that forms at least a portion of the connection between the antenna element 921 and the positioning unit 935. Still other ways of changing electrical distance may be used.

Referring to FIG. 5 in particular again, still with further reference to FIGS. 1, 2, and 6-9, the physical state determination unit 550 is configured to determine the physical state of the UE 500. For example, the physical state determination unit 550 may be configured to determine a physical state of one or more of the antenna elements 521, 522 (and/or other antenna elements) relative to one or more other components of the UE 500, e.g., another antenna element and/or the positioning unit 535. The physical state determination unit 550 may determine the separation and/or orientation of the antenna elements 521, 522 and/or the electrical distance between the antenna element 521 and the positioning unit 535 and/or the electrical distance between the antenna element 522 and the positioning unit 535. The physical state determination unit 550 may be communicatively coupled to one or more sensors that detect physical movement of the UE 500. For example, the physical state determination unit 550 may communicate with one or more of the sensor(s) 213 that is(are) configured to detect movement (e.g., pivoting, stretching, bending, etc.) of the UE 500. The sensor(s) 213 may include, for example, multiple electrical contacts each corresponding to a range of pivot angles of the top portion 602 of the UE 600 relative to the bottom portion 604 of the UE 600. Also or alternatively, the sensor(s) 213 may include one or more deflection sensors and/or one or more other appropriate sensors for detecting one or more physical changes of the UE 500 that may affect performance of the UE 500 and/or one or more desired operational characteristics (e.g., signals to be sent and/or signals to be received) associated with the UE 500. As another example, the physical state determination unit 550 may be configured to analyze one or more signals transferred between the antenna elements 521, 522 to determine one or more characteristics of a physical relationship between the antenna elements 521, 522.

The physical state notification unit 560 is configured to notify the positioning unit 535 and/or a network entity and/or any other appropriate entity of a present physical state of the UE 500 and/or of a change of the physical state of the UE 500. For example, the physical state notification unit 560 may send a notification to the positioning unit 535 and/or to a network entity, such as the TRP 300 and/or the server 400, via the transceiver 520. The notification may have a variety of content, e.g., indicating a present physical state, indicating a change of physical state with or without indicating what has changed or by how much or to what value, etc.

Referring also to FIG. 10, the physical state notification unit 560 may provide a notification 1000 that indicates a present physical state of the UE 500. The notification includes a physical parameter(s) field 1010, an operational parameter(s) field 1020, and a state code field 1030. The physical parameter(s) field 1010 includes, in this example, a separation field, an orientation field, and an electrical distance field. The operational parameter(s) field, in this example, includes an attenuation field, a UL-PRS field, a DL-PRS field, and an enable/disable antenna(s)/antenna element(s) field. The notification 1000 is an example only and more or fewer fields of information and/or one or more different fields of information and/or more or fewer entries (than the two entries shown) may be included in the notification. For example, perhaps the physical parameter(s) field 1010 is included and the operational parameter(s) field 1020 omitted, or one or more of the attenuation, UL-PRS, DL-PRS, and/or en/dis ant(s)/AE(s) fields omitted. Numerous other examples are possible. The physical state may be indicated in a variety of ways, e.g., by the separation and orientation fields that indicate, respectively, a separation and relative orientation between antenna elements (and/or entire antennas, one or more of which may each contain multiple antenna elements). The electrical distance field indicates an electrical length (e.g., in wavelengths) between specified entities. The UL-PRS and DL-PRS fields may indicate a respective PRS configuration (e.g., frequency layer (FL), subcarrier spacing (SCS), and/or one or more offsets (e.g., time and/or frequency offsets), etc.). Based on the physical state of the UE 500, the processor 510 may enable and/or disable one or more antennas and/or one or more antenna elements (e.g., to improve performance, to avoid using energy that will not improve performance or not improve performance significantly (e.g., sufficiently to justify the energy use, etc.). The physical state may be indicated in terms of parameter values such as values of the separation, orientation, and/or electrical distance fields. As another example, the notification may indicate one or more operational parameter values such as one or more performance characteristic values (e.g., isolation between antenna elements, attenuation to incoming and/or outgoing signals (and possibly corresponding indicated frequency), one or more enabled or disabled antenna elements and/or antennas (en/dis ant(s)/AE(s)), etc. The physical parameter(s) and/or the operational parameter(s) may be indicated by the value(s) for the corresponding parameter(s) directly, or may be indicated indirectly by a coded value of the state code field 1030 that corresponds to one or more physical parameter values and/or one or more operational parameter values, e.g., corresponding to one state configuration from a set of state configurations that each correspond to one or more physical parameter values and/or one or more operational parameter values. In the notification 1000, the state code value of PS13 corresponds to the physical parameters and the operational parameter indicated in an entry 1050 and the state code value PS7 corresponds to the physical parameters and the operational parameter indicated in an entry 1060. The operational parameter values may indicate performance of the UE 500, e.g., of one or more antennas and/or one or more antenna elements, or characteristics for operation of the UE 500, e.g., desired incoming signal characteristic(s) (e.g., a DL-PRS configuration) and/or desired outgoing signal characteristic(s) (e.g., a UL-PRS configuration). Each of the entries 1050, 1060 may correspond to one or more stored sensor values, e.g., stored in a table of sensor values and notification field values corresponding to each set of sensor values. The table may be multi-dimensional, with discrete values and/or ranges of sensor outputs and for each combination of sensor outputs there is a corresponding physical state (e.g., one or more corresponding physical parameter values and/or operational parameter values).

Referring also to FIG. 11, the physical state notification unit 560 may provide a notification 1100 that indicates a present physical state of the UE 500 in terms of one or more changes to a previous physical state. The physical state notification unit 560 may provide delta values (differential values) indicating the change(s) to the parameter(s) that has(have) changed. The physical state notification unit 560 may indicate zero change for any parameter that has not changed (e.g., more than a threshold amount) or may not indicate anything for any parameter that has not changed. The notification 1100 includes a physical parameter(s) field 1110, and an operational parameter(s) field 1120. While the UL-PRS and DL-PRS fields are not included in the example notification 1100 shown in FIG. 11, these fields could be included and may have delta values for appropriate parameters (e.g., offset(s)). The delta values may comprise magnitude and "direction" of the change, i.e., whether the change is an increase in magnitude or a decrease in magnitude. The antenna or antenna element enable/disable field may indicate one or more antenna elements and/or one or more antennas, with the identification of the antenna/antenna element implicitly indicating the respective component has changed enabled/disabled status, or the field may also indicate the enable/disable status explicitly. Numerous other techniques for indicating change of parameter status may be used.

Figure 12:
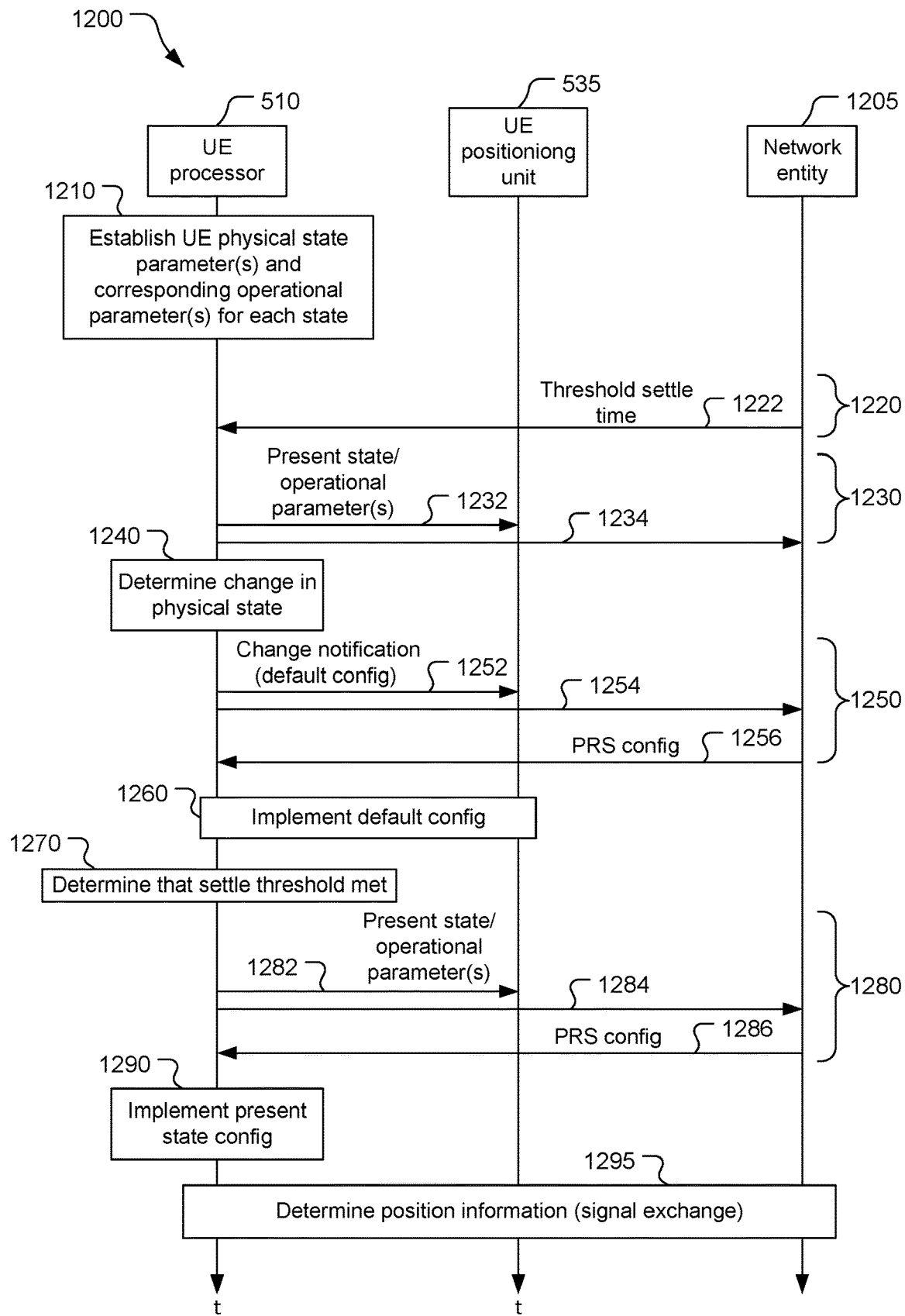
FIG. 12 is a signaling and process flow for providing notifications of physical state change of a user equipment and determining position information based on physical state changes of the user equipment.

Referring to FIG. 12, with further reference to FIGS. 1-11, a signaling and process flow 1200 for providing notifications of physical state change of a UE and determining position information based on physical state changes of a UE includes the stages shown. The flow 1200 is an example only, as stages may be added, rearranged, and/or removed. For example, one or more of stages 1220, 1230, 1250, 1260, and 1270 may be omitted. Any of the stages shown and discussed may be modified, e.g., to include more or fewer actions, or to provide more or less or different information, etc.

At stage 1210, one or more UE physical state parameters and one or more corresponding operational parameters for each state are established. For example, during manufacture of the UE 500, values may be stored by the processor 510 in the memory 520 corresponding to physical states of the UE 500 and associated operational parameters. Each of the physical states may be defined by one or more physical parameter value(s) of one or more physical parameters. For example, each of multiple values of a sensor indicating relative angle 603 of the top portion 602 of the UE 600 relative to the bottom portion 604 may correspond to a respective one or multiple physical states of the UE 600. Each of the states may, for example, correspond to a respective value of a physical parameter, a respective range of values of a physical parameter value, or a respective combination of values of multiple physical parameters (one or more of which may be a range of values of a respective parameter). The value(s) corresponding one or more of the states may be determined, e.g., by testing, during manufacture, and/or or may be determined before manufacture of the UE 500 (e.g., based on a design of the UE 500 and/or testing of one or more samples of the UE 500) and used for UEs of similar design (e.g., all UEs of similar design or UEs of similar design that are likely to have similar manufacturing characteristics (e.g., made in a common batch of UEs, etc.)). The corresponding operational parameter value(s) may include, for example, PRS configuration information, which antenna element(s) to enable, which antenna element(s) to disable, electrical distance between UE components, and/or attenuation, and/or one or more other values of one or more other parameter values (e.g., one or more antenna characteristics such as radiation pattern and/or radiation pattern properties), etc.

At stage 1220, a network entity 1205 (e.g., the TRP 300 or the server 400) sends a threshold settle time message 1222 to the processor 510 (e.g., via the transceiver 520). The threshold settle time message 1222 indicates a threshold time for the UE 500 to be in a present physical state, after a change of physical states of the UE 500, before the processor 510 will notify the network entity 1205 of the change to the present physical state.

At stage 1230, the processor 510 provides present state/operational parameter(s) notifications 1232, 1234 to the positioning unit 535 and the network entity 1205, respectively. The notifications 1232, 1234 may comprise, for example, one or more physical parameter values and/or one or more operational parameter values, for example, in a notification such as the notification 1000. The notifications 1232, 1234 may indicate the value(s) directly (e.g., comprising one or more values of the field 1010 and/or the field 1020) or indirectly (e.g., by indicating a value of the state code field 1030). The processor 510 may provide both of the notifications 1232, 1234 or only one of the notifications 1232, 1234. The notifications 1232, 1234 may indicate a capability of the UE 500 to have multiple physical states (e.g., to indicate that the UE 500 is movable and/or flexible). The notifications 1232, 1234 may provide information regarding potential physical states, e.g., operational parameter values and/or operational parameter value sets. The notifications may indicate, e.g., based on user input (e.g., via the user interface 216), that a present physical state is expected to be constant and that the UE 500 will provide notice if the physical state of the UE 500 changes.

At stage 1240, the processor 510 determines a change in physical state of the UE 500. For example, the processor 510 may receive one or more sensor outputs from one or more corresponding sensors of the sensor(s) 213. The processor 510 analyzes the sensor output(s) to determine whether the physical state of the UE 500 has changed, e.g., based on one sensor output or a combination of sensor outputs. If no change is determined by the processor 510, then the processor 510 continues to monitor the sensor output(s). Whether two physical arrangements of the UE 500 qualify as different physical states may depend on operational parameter values (e.g., antenna characteristics). Different sensor output(s) that have the same operational parameter(s) are considered the same physical state, while different physical states correspond to different sensor output values that correspond to different operational parameter values, e.g., at least one operational parameter having different values in the different physical states and/or the presence of an operational value for one state and not the other state. If the processor 510 detects a physical state change, then the flow 1200 proceeds to stage 1250. Also or alternatively, the processor 510 may determine an expected change in physical state of the UE 500, e.g., based on expected future movement (e.g., a scheduled movement such as for a UE that performs repetitive movements, such as an Industrial Internet of Things (IIoT) UE). If a physical state change is expected, then the flow 1200 proceeds to stage 1250.

At stage 1250, the processor 510 sends change notifications 1252, 1254 to the positioning unit 535 and the network entity 1205, respectively. The change notifications 1252, 1254 may indicate a physical state change of the UE 500, e.g., that the physical state of the UE 500 has changed or is expected to change (and possibly when). The notifications 1252, 1254 may provide information as to how the physical state has changed or will change (e.g., what the physical state has or is expected to changed to), or simply that the physical state has changed, or will change, without further information. The notifications 1252, 1254 may provide information as to the state change, e.g., present antenna element separation, present antenna element orientation, electrical distance between an antenna element and another component of the UE 500 (e.g., the positioning unit 535). The information as to the state change may indicate one or more present parameter values (e.g., as shown in the notification 1000) and/or change(s) relative to one or more previous parameter values (e.g., as shown in the notification 1100). The notification may indicate enabled/disabled antennas and/or antenna elements. The notification may indicate a requested or recommended PRS configuration (e.g., DL-PRS configuration and/or UL-PRS (SRS for positioning) configuration), e.g., a PRS configuration that will allow for the best performance for the physical state (e.g., due to one or more disabled antenna elements and/or one or more disabled antennas for the physical state). The physical state notification unit 560 may select from a list of UL-PRS configurations and/or DL-PRS configurations (e.g., provided by the network entity 1205) based on the present physical state of the UE 500. The notification may indicate one or more calibration parameters, e.g., Rx-Tx delay, Rx delay, and/or Tx delay, e.g., based on one or more physical conditions of the physical state of the UE 500, e.g., based on one or more electrical distances (e.g., between the positioning unit 535 and one or more other components such as the antenna element(s) 512, 522). The processor 510 may provide both of the notifications 1252, 1254 or only one of the notifications 1252, 1254. The network entity 1205 may send a PRS configuration message 1256 with a DL-PRS configuration and/or a UL-PRS configuration, e.g., based on the request or recommendation received from the UE 500. Reporting performance characteristics may be useful in determining capability(ies) of the UE 500. For example, with the antenna elements 521, 522 sufficiently separated, the UE 500 may be able to perform full-duplex operations, but with the antenna elements 521, 522 disposed in close proximity, full duplex may not be possible (e.g., transmissions from the antenna element 521 may saturate the antenna element 522). As another example, a phase difference in a signal may be used to determine an AoA if the antenna elements 521, 522 are in close proximity but not if the antenna elements 521, 522 are far apart. The notifications 1252, 1254 may indicate one or more physical parameters of the physical state of the UE 500, e.g., the spacing of the antenna elements 521, 522, which may be used to correct timing relationships.

The notifications 1252, 1254 may indicate a default (baseline) configuration. For example, the default configuration may be a default set of operational parameter values, e.g., a worst-case set of operational parameter values from multiple possible sets of operational values (each set including one or more operational parameter values). The default configuration may be indicated if the physical state change is toward a state of lesser performance characteristics, e.g., from a highest performance characteristics state. The notifications 1252, 1254 may not indicate to change operational parameter values, e.g., if the physical change of the UE 500 is toward one or more physical states in all of which no operational characteristic value is worse than in the physical state from which the UE 500 is changed (e.g., the physical state corresponding to presently-used operational parameter values). For example, if a present physical state of the UE 600 is the state 620 and the top portion 602 moves (pivots) away from the bottom portion 604, and all states between the state 620 and the state 610 have all corresponding operational characteristics as least as good as the operational characteristic values in the state 620, then the notifications 1252, 1254 may not indicate a change in operational characteristics. The physical state notification unit 560 may send the default configuration in response to the physical state determination unit 550 determining that the physical state of the UE 500 has changed. The default configuration may be indicated as a conservative measure, e.g., because the physical state determination unit 550 may not know the ultimate physical state that the UE 500 will be changed to, and the physical state notification unit 560 may be configured not to send the notifications until a physical state is settled upon (e.g., a single physical state being present for at least the threshold settle time), e.g., to limit message traffic between the UE 500 and the network entity 1205 to conserve power and/or to reduce notifications of transient physical states. For example, physical states of the UE 500 may be changed slowly (e.g., over several seconds) whereas the units 550, 560 may operate much faster (e.g., being able to detect and report changes every 100 ms, for example), thus to avoid excess notification traffic, notification may be delayed until a state change is complete and stable.

At stage 1260, the default configuration indicated by the notifications 1252, 1254 is implemented is implemented by the UE 500. For example, the processor 510, possibly in conjunction with the memory 520, and/or the positioning unit 535 perform one or more operations (e.g., signal measurement, signal transmission, etc.) in accordance with the operational parameter value(s) of the default configuration.

At stage 1270, the processor 510 determines that the threshold settle time has been reached. The processor 510 analyzes the physical state of the UE 500 and determines whether the threshold settle time has elapsed without the physical state of the UE 500 changing. Stage 1260 may be omitted from the flow 1200, e.g., if stage 1220 is omitted or the threshold settle time is otherwise not provided (e.g., by an entity other than the network entity 1205) or not known (e.g., stored in the memory 530 during manufacture of the UE 500). Determining whether the threshold settle time has been reached provides hysteresis to delay changing operation of the UE 500 in accordance with a physical state until the UE 500 is stabilized in that physical state.

At stage 1280, the processor 510 sends change notifications 1282, 1284 to the positioning unit 535 and the network entity 1205, respectively. The change notifications 1282, 1284 may be similar to the change notifications 1252, 1254, e.g., providing information as to how the physical state has changed (e.g., what the physical state has changed to (such as the operational parameters of the physical state)), or simply that the physical state has changed without further information. The notifications 1282, 1284 may indicate one or more present parameter values (e.g., as shown in the notification 1000) and/or change(s) relative to one or more previous parameter values (e.g., as shown in the notification 1100). The notifications 1282, 1284 indicate information for a present physical state instead of a default state (although the present state may correspond to the default state). If stage 1270 is omitted, or if the notifications 1282, 1284 are based on an expected physical state change, then the processor 510 may send the notifications 1282, 1284 without waiting for the threshold settle time to pass while the UE 500 is in the same physical state. The network entity 1205 may send a PRS configuration message 1286 with a DL-PRS configuration and/or a UL-PRS configuration, e.g., based on a request or recommendation received from the UE 500 in the notification 1284.

At stage 1290, the present configuration, corresponding to the present physical state indicated by the notifications 1252, 1254, is implemented is implemented by the UE 500. For example, the processor 510, possibly in conjunction with the memory 520, and/or the positioning unit 535 perform one or more operations (e.g., signal measurement, signal transmission, etc.) in accordance with the operational parameter value(s) of the present configuration.

At stage 1295, the server processor 510, the positioning unit 535, and/or the network entity determines position information. For example, appropriate signals (e.g., PRS) are exchanged (e.g., in accordance with the PRS configuration(s) indicated by the PRS configuration message(s) 1256, 1286) and the processor 510, the positioning unit 535, and/or the network entity 1205 uses the signal exchange, and the physical parameter(s) (e.g., electrical distance) and/or the operational parameter(s) as appropriate to determine position information for the UE 500, e.g., to determine a location estimate for the UE 500.

Figure 13:
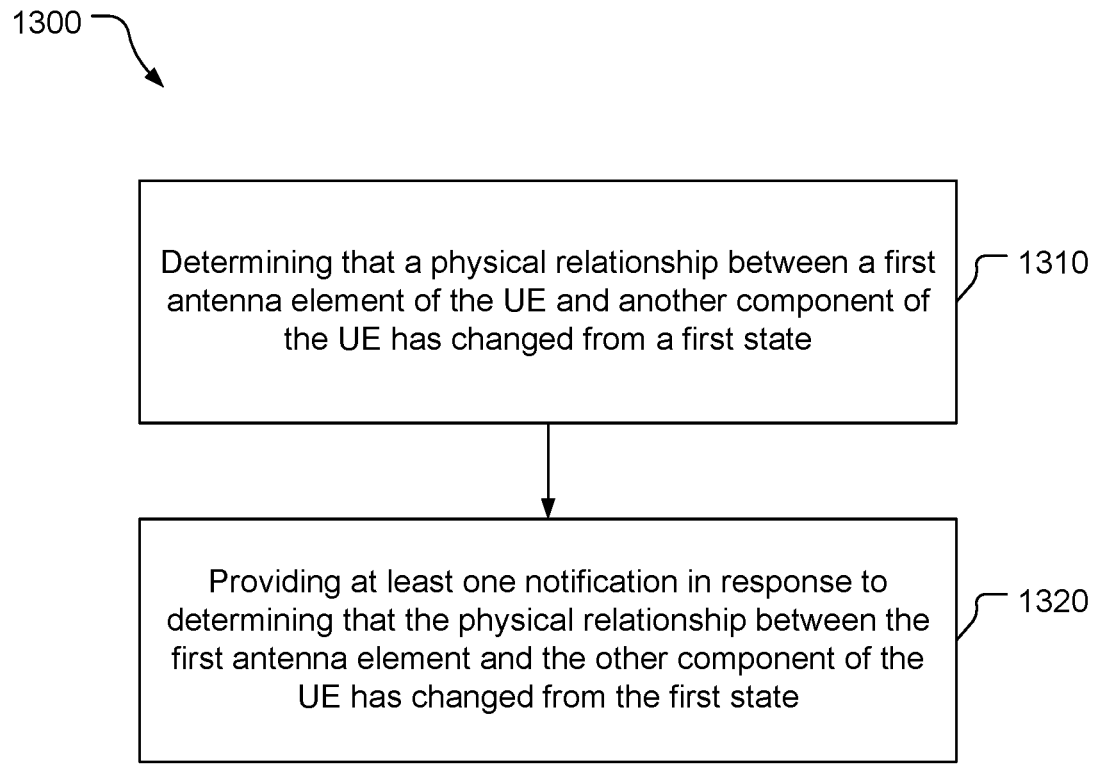
FIG. 13 is a block flow diagram of a method of responding to a change in physical state of a user equipment.

Referring to FIG. 13, with further reference to FIGS. 1-12, a method 1300 of responding to a change in physical state of a UE includes the stages shown. The method 1300 is, however, an example only and not limiting. The method 1300 may be altered, e.g., by having stages added, removed, rearranged, combined, performed concurrently, and/or having single stages split into multiple stages.

At stage 1310, the method 1300 includes determining that a physical relationship between a first antenna element of the UE and another component of the UE has changed from a first state. For example, the processor 510 may analyze one or more sensor outputs to determine whether one or more of the outputs has changed by more than a corresponding threshold amount (e.g., such that the sensor output is outside of a range corresponding to a physical state that the UE 500 was in). The processor 510 may conclude that the UE 500 has changed from (e.g., changed from being in, ceased being in) the first state if one or more sensor outputs changes more than the corresponding threshold or goes from being in a corresponding range to being outside the corresponding range. The range may be different for different physical states (e.g., one state may have one or more first ranges of one or more outputs and another state may have one or more second ranges for the one or more outputs, with one or more of the one or more second ranges may be different than the respective first range(s), i.e., of the same output(s)). The processor 510, possibly in combination with the memory 530 and one or more sensors, may comprise means for determining that a physical relationship between a first antenna element of the UE and another component of the UE has changed from a first state.

At stage 1320, the method 1300 includes providing at least one notification in response to determining that the physical relationship between the first antenna element and the other component of the UE has changed from the first state. For example, the processor 510 may provide one or more notifications internally to the UE 500 and/or externally to the UE 500 based on the physical relationship change. The processor 510, possibly in combination with the memory 530, and possibly in combination with the transceiver 520 (e.g., the wireless transmitter 242 and the antenna 246) may comprise means for providing the at least one notification.

Implementations of the method 1300 may include one or more of the following features. In an example implementation, providing the at least one notification comprises sending a first notification to a positioning unit of the UE that is configured to determine a position of the UE, or sending a second notification to a network entity from the UE, or a combination thereof. For example, the processor 510 may send the notification 1232 and/or the notification 1234 and/or the notification 1252 and/or the notification 1254 in response to determining the change in physical state at stage 1240. The processor 510, possibly in combination with the memory 530, and possibly in combination with the transceiver 520 (e.g., the wireless transmitter 242 and the antenna 246) may comprise means for sending the first notification and/or means for sending the second notification. In another example implementation, determining that the physical relationship between the first antenna element and the other component of the UE has changed from the first state comprises determining whether a separation between the first antenna element and a second antenna element has changed, or determining whether an orientation of the first antenna element relative to the second antenna element has changed, or a combination thereof. For example, the processor 510 may determine that the distance between the antenna elements 521, 522 changes from meeting a separation criterion (e.g., being within a separation range corresponding to the first state) to not meeting the separation criterion (e.g., being outside the separation range corresponding to the first state). As another example, the processor 510 may determine that the orientation between the antenna elements 521, 522 changes from meeting an orientation criterion (e.g., being within an orientation range corresponding to the first state) to not meeting the orientation criterion (e.g., being outside the orientation range corresponding to the first state). The separation range and/or the orientation range may be different for different ranges (e.g., different magnitude ranges, different percentage ranges, etc.). For example, one state may have a separation range of X+/−5% while another state has a separation range of Y+/−2%. In another example implementation, the at least one notification indicates that the physical relationship between the first antenna element and the other component of the UE has changed. The notification(s) may indicate that a physical state has changed, e.g., without indicating what physical characteristic has changed or by how much. In another example implementation, the at least one notification indicates: a present orientation of the first antenna element relative to the second antenna element; or a change in separation between the first antenna element and the second antenna element; or a change in orientation of the first antenna element relative to the second antenna element; or that the first antenna element is disabled; or that the second antenna element is enabled; or a downlink positioning reference signal configuration; or an uplink positioning reference signal configuration; or one or more calibration parameters associated with an electrical distance between the first antenna element and the other component of the UE; or any combination thereof. For example, the notification(s) may indicate a separation delta (e.g., increase/decrease and magnitude thereof) relative to a prior value, and/or may indicate an orientation delta (e.g., a three-dimensional change such as magnitude and direction of changes in each of the three spherical coordinate parameters ρ, θ, and ϕ). The calibration parameter(s) may include one or more calibration parameters based on a change in electrical distance between components of the UE 500, e.g., the antenna element 521 and another component of the UE 500 such as the positioning unit 535. The calibration parameter(s) may include, for example, Rx-Tx delay, Rx delay, and/or Tx delay.

Also or alternatively, implementations of the method 1300 may include one or more of the following features. In an example implementation, the at least one notification is at least one initial notification that indicates a default condition, and the method 1300 further comprises providing at least one further notification indicating that a present physical relationship between the first antenna element and the other component of the UE is in the second state. For example, the processor 510 may provide the further notification(s) to the positioning unit, or to the network entity, or a combination thereof. For example, the at least one further notification may comprise the notification(s) 1252, 1254 and may indicate a default, e.g., worst-case, configuration of one or more physical parameters and/or one or more operational parameters of the UE 500. The processor 510, possibly in combination with the memory 530, and possibly in combination with the transceiver 520 (e.g., the wireless transmitter 242 and the antenna 246) may comprise means for providing the at least one further notification. In another example implementation, the at least one further notification is provided in response to determining that the physical relationship between the first antenna element and the other component of the UE has been in the second state for at least a threshold amount of time. For example, the processor 510 may send the notification(s) 1252, 1254 and/or the notification(s) 1282, 1284 only if the physical state of the UE 500 has been stable in the same physical state for a threshold time. In another example implementation, the method 1300 comprises receiving, at the UE from a network entity, an indication of the threshold amount of time. For example, the processor 510 may receive the threshold settle time from the network entity 1205 in the threshold settle time message 1222.

Also or alternatively, implementations of the method 1300 may include one or more of the following features. In an example implementation, the at least one notification is at least one initial notification, and the method 1300 further comprises providing at least one further in response to determining that the physical relationship between the first antenna element and the other component of the UE has returned to the first state and that the physical relationship has been in the first state, after returning to the first state, for at least a threshold amount of time. For example, the processor 510 may provide notifications of state changes and/or the present physical state of the UE 500 in an ongoing manner, e.g., by repeating the flow 1200 (e.g., other than stage 1210). The processor 510 may provide the further notification(s) to the positioning unit 535, or to the network entity 1205, or a combination thereof. The processor 510, possibly in combination with the memory 530, and possibly in combination with the transceiver 520 (e.g., the wireless transmitter 242 and the antenna 246) may comprise means for sending the at least one further notification. In another example, implementation, the method 1300 comprises sending a capability message, to a network entity from the UE, indicating multiple configurations each corresponding to different physical relationships between the first antenna element and the other component of the UE. For example, the processor 510 may send, e.g., in the notification 1234 and/or the notification 1254, multiple configuration sets with each configuration set including one or more physical parameters (e.g., physical relationship indicators), one or more calibration parameters, and/or one or more operational parameters (e.g., one or more PRS configurations/configuration parameters, etc.). The processor 510, possibly in combination with the memory 530, in combination with the transceiver 520 (e.g., the wireless transmitter 242 and the antenna 246) may comprise means for sending the capability message to the network entity. In another example implementation, the method 1300 comprises providing a configuration indication of one or more configuration parameters to be used by the UE until indicated otherwise by the UE. For example, the processor 510 may send an indication that a configuration used by the UE 500 is frozen and can be assumed to be used by the UE 500 unless a notification indicating otherwise is received, e.g., from the UE 500. The processor 510, possibly in combination with the memory 530, possibly in combination with the transceiver 520 (e.g., the wireless transmitter 242 and the antenna 246) may comprise means for providing the configuration indication.

Other Configurations

Antenna characteristics such as antenna array gain distribution and/or radiation pattern/shape as a function of device form factor (e.g., spatial relationship such as angle between portions of the device) and frequency(ies) may be conveyed from the device to a server (e.g., an LMF), e.g., to assist with UE-side positioning. This may help accommodate ultra-wide bandwidth operations. For example, referring again to FIG. 6, with fixed inter-antenna-element spacing in an antenna system and variable separation between different parts of a device (e.g., variable separation of the top portion 602 and the bottom portion 604 of the UE 600, such as an angle 603 between the portions 602, 604), a radiation pattern of an antenna system, and/or radiation pattern(s) from the joint use of multiple antenna systems may be dynamic. For example, an antenna system may be disposed in each of the portions 602, 604 (e.g., in lieu of or in addition to the antenna elements 521, 522). Antenna system characteristics such as radiation patterns may vary across frequencies of operation, e.g., with an antenna system (specific for some frequencies) possibly missing in one or more parts of the device. For example, an antenna system for one frequency may be in the top portion 602 of the UE 600 and not in the bottom portion 604 of the UE 600, even if antenna systems for another frequency are disposed in both the top portion 602 and the bottom portion 604 of the UE 600. As another example, a device may have moving parts (e.g., moving arms of an IIoT device) and the joint use of these moving parts may lead to dynamic antenna characteristics such as radiation patterns. For example, for some beam weights, dominant side/grating lobes may appear in conjunction with main lobes in radiation pattern, ambiguating a position estimate while for other beam weights, the main lobe may dominate with no (significant) grating lobe. To help resolve this ambiguity, dynamic antenna characteristics (e.g., dynamic radiation pattern(s)) may be provided by a dynamic form factor device to an entity that will perform or assist in performing positioning for the device, e.g., to a server (e.g., an LMF).

Figure 14:
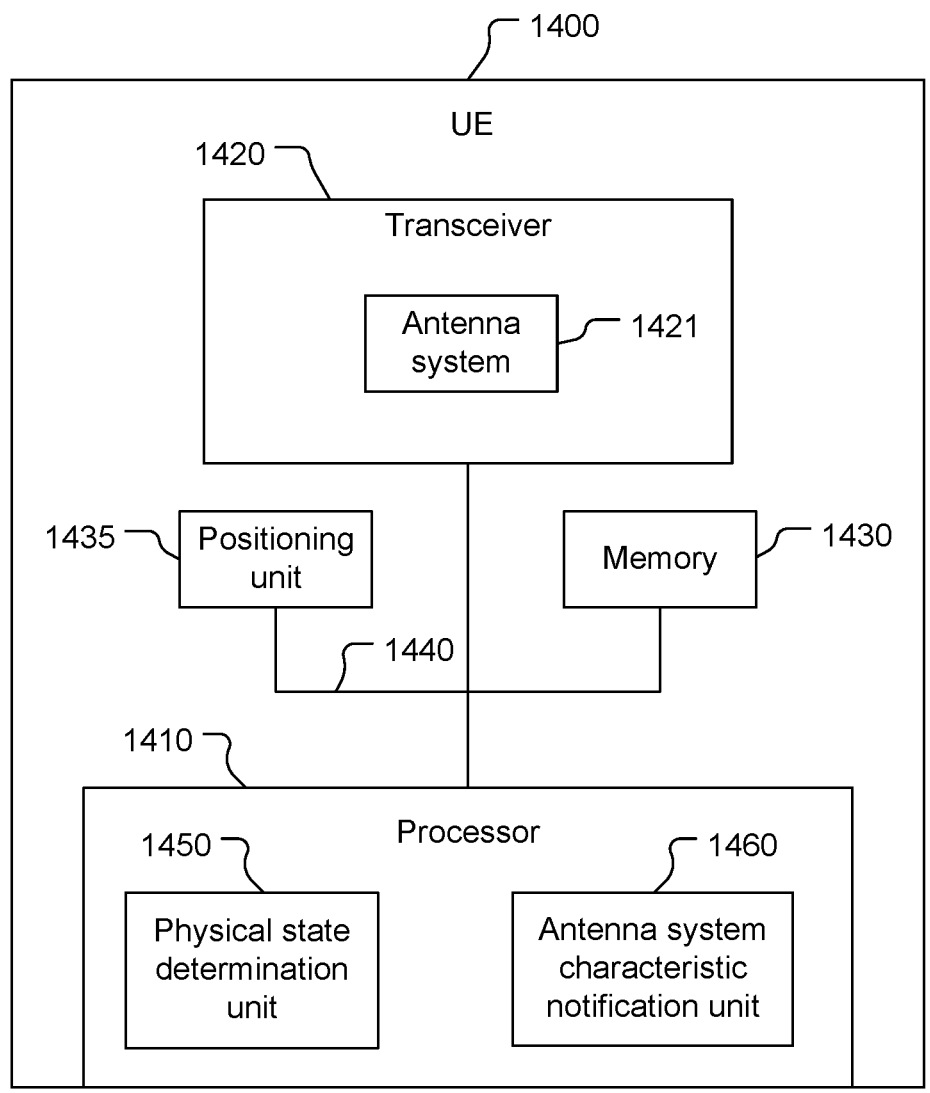
FIG. 14 is a block diagram of another example user equipment.
Figure 15:
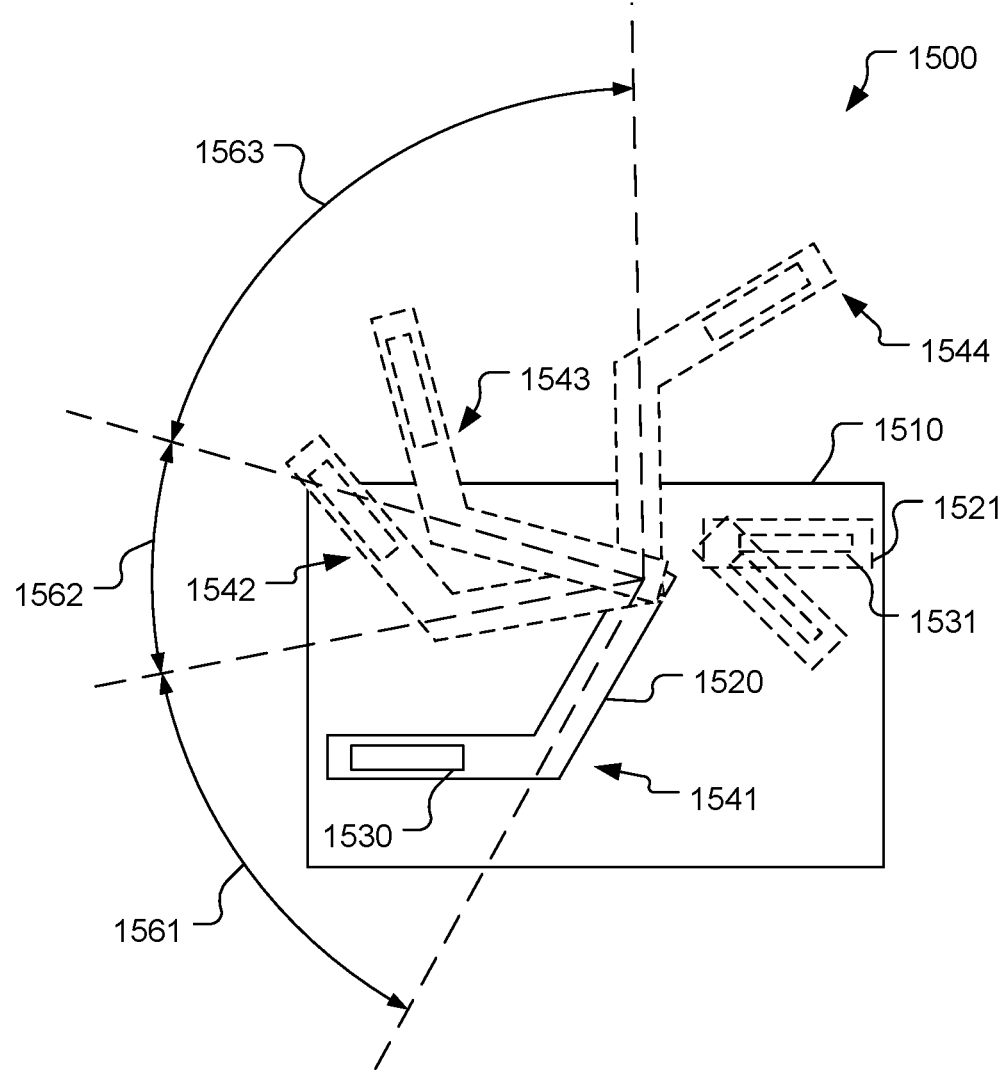
FIG. 15 is a simplified side view of a device with movable arm that includes an antenna system.

Referring to FIG. 14, with further reference to FIGS. 1-4, a UE 1400 includes a processor 1410, a transceiver 1420, a memory 1430, and a positioning unit 1435 communicatively coupled to each other by a bus 1440. The UE 1400 may be any of a variety of types of devices, e.g., a laptop computer, a tablet computer, a smartphone, an IIoT device, etc. The UE 1400 may include the components shown in FIG. 14, and may include one or more other components such as any of those shown in FIG. 2 such that the UE 200 may be an example of the UE 1400. For example, the processor 1410 may include one or more of the components of the processor 210. The transceiver 1420 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the transceiver 1420 may include the wired transmitter 252 and/or the wired receiver 254. The memory 1430 may be configured similarly to the memory 211, e.g., including software with processor-readable instructions configured to cause the processor 1410 to perform functions. The positioning unit 1435 is configured to determine a position of the UE 1400 and may be part of a modem of the UE 1400 and/or may be implemented partially by, or completely by, the processor 1410.

The description herein may refer to the processor 1410 performing a function, but this includes other implementations such as where the processor 1410 executes software (stored in the memory 1430) and/or firmware. The description herein may refer to the UE 1400 performing a function as shorthand for one or more appropriate components (e.g., the processor 1410 and the memory 1430) of the UE 1400 performing the function. The processor 1410 (possibly in conjunction with the memory 1430 and, as appropriate, the transceiver 1420) may include a physical state determination unit 1450 and an antenna system characteristic notification unit 1460. The physical state determination unit 1450 and the antenna system characteristic notification unit 1460 are discussed further below, and the description may refer to the processor 1410 generally, or the UE 1400 generally, as performing any of the functions of the physical state determination unit 1450 and/or the antenna system characteristic notification unit 1460, and the UE 1400 is configured to perform the functionality discussed. One or both of the units 1450, 1460, or one or more portions thereof, may be implemented in one or more other components of the UE 1400, e.g., in the positioning unit 1435 (e.g., a modem).

The transceiver 1420 includes an antenna system 1421. The antenna system 1421 comprises one or more antenna elements, and may be part of a single antenna panel or parts of respective separate antenna panels. Further, more than one antenna system may be included in the UE 1400. The UE 1400 is configured to be physically altered (e.g., a body of the UE 1400 folded, bent, one portion moved relative to another portion, etc.) such that a physical state of the UE 1400 is changed that affects one or more antenna characteristics of the antenna system 1421, e.g., a radiation pattern of the antenna system 1421. The UE 1400 may be, for example, pivotable, rollable, bendable, stretchable, etc. The antenna system 1421 may perform differently depending on the physical state of the UE 500 (e.g., whether the antenna system 1421 is blocked by another portion of the UE 1400, whether the antenna system 1421 interacts with another antenna system of the UE 1400, etc.). For example, a physical relationship(s) of a display of the UE 1400, a housing of the UE 1400, and/or one or more electronic components other than the antenna system 1421 relative to one or more of the antenna elements of the antenna system 1421 may change as the physical state of the UE 500 changes and the change(s) may affect performance of the antenna system 1421. For example, the housing may block the antenna system 1421 more in some physical states of the UE 1400 than in others, possibly causing more attenuation of incoming signals to the antenna system 1421 and/or to outgoing signals from the antenna system 1421. As another example, the antenna system 1421 may couple to another antenna system more in some physical states of the UE 1400 than others. The antenna system 1421 is retained by the body of the UE 1400, e.g., attached by adhesive to a frame or housing, or contained within the body, with the body also retaining the transceiver 1420, the memory 1430, and the processor 1410 as part of the UE 1400.

Figure 16:
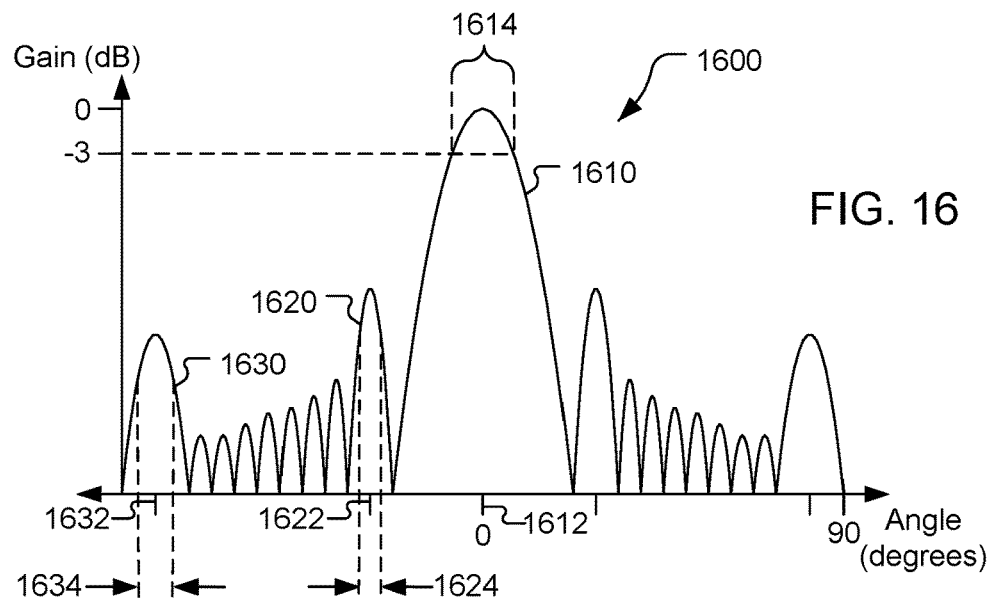
FIG. 16 is a radiation pattern of the antenna system shown in FIG. 15 with the device in a first physical state.
Figure 17:
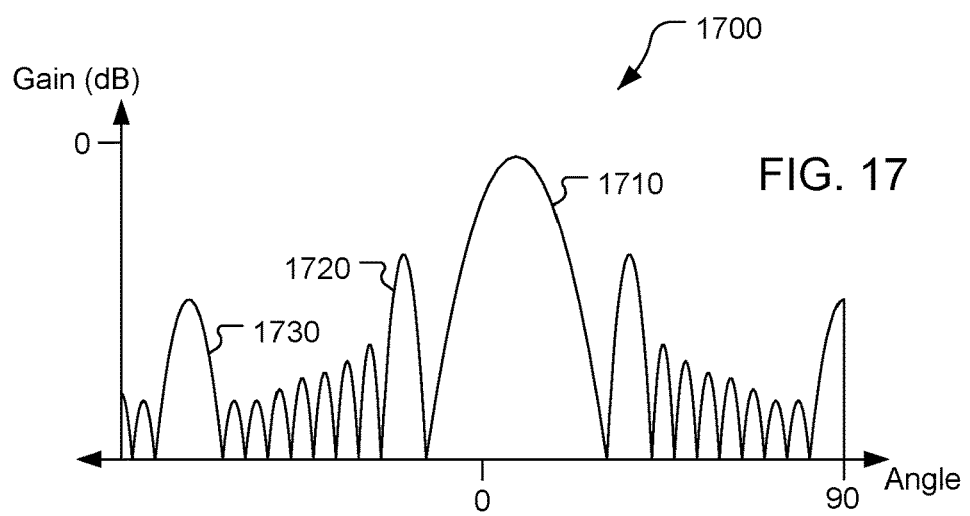
FIG. 17 is a radiation pattern of the antenna system shown in FIG. 15 with the device in a second physical state.
Figure 18:
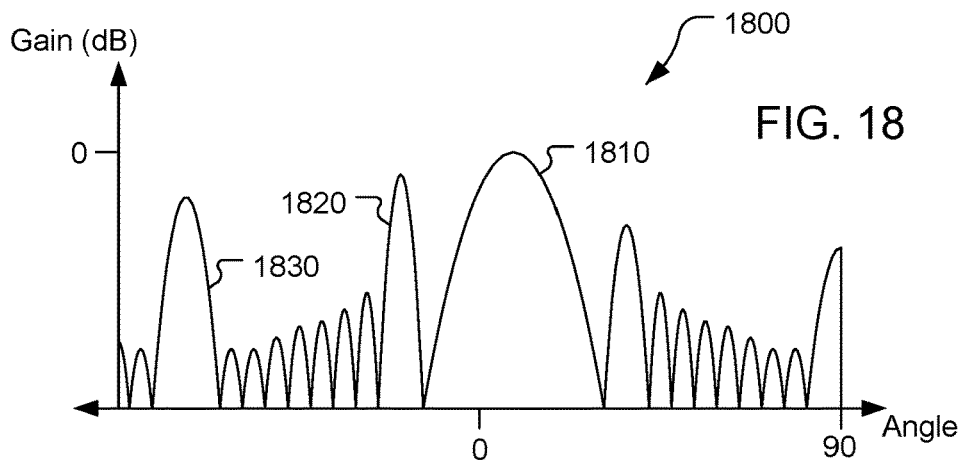
FIG. 18 is a radiation pattern of the antenna system shown in FIG. 15 with the device in a third physical state.

Referring also to FIGS. 15-18, the UE 1400 may be an IIoT device 1500 that includes a body 1510 and an arm 1520 that is configured to move (here, rotate) with respect to the body 1510 and that includes an antenna system 1530. In this example, the arm 1520 is configured to rotate between a first position 1541 and a second position 1544. From (and including) the first position 1541 to (and including) the second position 1544, the IIoT device 1500 has numerous physical states, and one or more performance characteristics may be different in the different physical states. The physical states may be quantized into a reduced set of physical states, e.g., if the performance characteristics are similar across the physical states within a single quantized physical state. For example, from the first position 1541 to the second position 1544 of the arm 1520, the physical states of the IIoT device 1500 (or another form of the UE 1400) may be quantized into a first physical state (PS1) corresponding to the arm 1520 being in a range 1561 between the first position 1541 and a first intermediate position 1542, a second physical state (PS2) corresponding to the arm 1520 being in a range 1562 between the first intermediate position 1542 and a second intermediate position 1543, and a third physical state (PS3) corresponding to the arm 1520 being in a range 1563 between the second intermediate position 1543 and the second position 1544. For each quantized state, a set of performance characteristics may be used for the entire respective range. The set of performance characteristics may represent a minimum performance quality over the respective physical state PS1-PS3. For example, as shown in FIGS. 16-18, a radiation pattern 1600 may correspond to the first physical state PS1, a radiation pattern 1700 may correspond to the second physical state PS2, and a radiation pattern 1800 may correspond to the third physical state PS3. In this example, the radiation patterns 1600, 1700, 1800 are shown in dB as a function of angle (e.g., from mechanical boresight). In the radiation pattern 1600, a main beam 1610 has a center angle 1612 that is located at 0° and has a peak at a normalized value of 0 dB, the main beam 1610 being used as a reference (although gains could be provided in absolute terms, e.g., dBi, instead of relative terms). A 3 dB beamwidth 1614 of the main beam 1610 is about 14°. A side lobe 1620 has a center angle 1622 at about −28°, has a gain of about −12 dB (relative to the main beam 1610), and has a 3 dB beamwidth 1624 of about 6°. A side lobe 1630, which may be a grating lobe, has a center angle 1632 at about −82°, has a gain of about −15 dB, and has a 3 dB beamwidth 1634 of about 9°. The radiation pattern 1700 is essentially the radiation pattern 1600 shifted about 9° to the right, and with a main beam 1710 being lower in gain and wider, being about 5 dB above a side lobe 1720 and with a 3 dB beamwidth of about 15°. The radiation pattern 1800 is essentially the radiation pattern 1700 but with a main beam 1810 being even lower in gain than the main beam 1710, being about 1.5 dB above a side lobe 1820 and about 3 dB above a side lobe 1830, and with a 3 dB beamwidth of about 16°, and with the side lobe 1830 being closer in gain to the main beam 1810 than a side lobe 1730 to the main beam 1710. These values are hypothetical and examples for illustrative purposes to facilitate understanding and are not limiting of the disclosure. Also, the movement of the IIoT device 1500 is an example used to illustrate concepts of changing operational characteristics with changing physical state of the UE 1400 and other movements and/or configurations may be used. For example, in addition to the arm 1520, the IIoT device 1500 may include one or more other moving parts such as another arm 1521, which may include an antenna system 1531. The quantized states of the IIoT device 1500 may be due to the combined locations of the arms 1520, 1521 (e.g., combined movement/locations of the arms 1520, 1521) and thus the antenna systems 1530, 1531. For example, some relative relationships of the antenna systems 1530, 1531 may be used for improving rate or diversity performance, and thus antenna system characteristics for these relationships may be included in the quantized physical states.

Not all physical states of the UE 1400 may be quantized. If the physical state of the UE 1400 is changed to a non-quantized state, the UE 1400 (e.g., the antenna system characteristic notification unit 1460) may send a notification of a closest set of antenna system characteristics (e.g., a closest quantized radiation pattern for the antenna system 1421) to, for example, the server 400. The closest set quantized radiation pattern may, for example, be determined based on direction between main, side, and/or grating lobes of an actual radiation pattern corresponding to the physical state and the radiation patterns of the quantized physical states.

Referring to FIG. 14, with further reference to FIGS. 1, 2, 6-9, and 15, the physical state determination unit 1450 is configured to determine the physical state of the UE 1400. For example, the physical state determination unit 550 may be configured to determine a physical state of the UE 1400 based on one or more sensor values (e.g., indicating an amount of folding of the UE 1400, bending of the UE 1400, rotating of the arm 1520, etc.). The physical state determination unit 1450 may determine a separation and/or orientation of the antenna system 1421 and another antenna system of the UE 1400 and/or the electrical distance (number of wavelengths of one or more frequencies of operation of the antenna system 1421) between the antenna element 1421 and another component of the UE 1400 (e.g., another antenna system). The physical state determination unit 1450 may be communicatively coupled to one or more sensors that detect physical movement of the UE 1400. For example, the physical state determination unit 1450 may communicate with one or more of the sensor(s) 213 that is(are) configured to detect movement (e.g., pivoting, stretching, bending, rotating, etc.) of the UE 1400. As another example, the physical state determination unit 1450 may be configured to analyze one or more signals transferred between the antenna system 1421 and another antenna system of the UE 1400 to determine the physical state of the UE 1400 and/or one or more characteristics of the physical state of the UE 1400. As another example, the physical state determination unit 1450 may be configured to analyze one or more signals for controlling a physical state of the UE 1400 to determine the physical state of the UE 1400. As another example, the physical state determination unit 1450 may be configured to analyze a schedule of future movement of the UE 1400 to determine one or more expected physical states of the UE 1400 and possibly timing of the expected physical state(s).

The antenna system characteristic notification unit 560 is configured to notify the positioning unit 1435 and/or a network entity and/or any other appropriate entity of a present physical state of the UE 1400 and/or of a change of the physical state of the UE 1400 and/or of an expected physical state of the UE 1400 and/or one or more antenna system characteristics corresponding to a physical state. For example, the antenna system characteristic notification unit 1460 may send a notification to the positioning unit 1435 and/or to a network entity, such as the TRP 300 and/or the server 400, via the transceiver 1420. The notification may have a variety of content, e.g., indicating a present physical state, indicating a change of physical state with or without indicating what has changed or by how much or to what value, indicating one or more antenna system characteristics (e.g., radiation pattern, radiation pattern parameters, etc.), etc.

Referring also to FIG. 19, the antenna system characteristic notification unit 1460 may provide a notification 1900 that indicates radiation patterns. In this example, the notification 1900 indicates three radiation patterns, but other notifications may include more or fewer radiation patterns (e.g., one radiation pattern). In the notification 1900, the radiation patterns are indicated by combinations of angles and corresponding gains. For example, in a first radiation pattern, at a first angle A11, the corresponding gain is a first gain G11, at a second angle A12, the corresponding gain is a second gain G12, etc. to an $n^{th}$ angle A1N with a corresponding gain G1N. Similar combinations of angle and gain are provided for second and third radiation patterns. A timing may be provided for the radiation patterns. For example, a timing T0 for the first radiation pattern may be zero, indicating that this is the present radiation pattern for the antenna system 1421. A timing value of greater than zero may indicate the number of seconds in the future, or a specific time in the future, at which the corresponding radiation pattern will be the present radiation pattern for the antenna system 1421. In addition to, or instead of, the angle and gain values, a state code may be indicated in the notification 1900, with each state code corresponding to a respective set of angle and gain values. In this example, the three quantized physical states PS1, PS2, PS3 corresponding to the ranges 1561-1563 shown in FIG. 15 correspond to the three radiation patterns provided. The number of quantized physical states may be configured by, for example, the server 400 or the TRP 300.

Referring also to FIGS. 20 and 21, the antenna system characteristic notification unit 1460 may provide notifications 2000, 2100 that indicate characteristics of radiation patterns. For example, instead of providing values to recreate the radiation patterns 1600, 1700, 1800, pertinent characteristics of the radiation patterns 1600, 1700, 1800 may be provided. In this example, the notifications 2000, 2100 include gains and beamwidths of the main beams 1610, 1710, 1810, and angles, gains, and beamwidths of the side lobes 1620, 1630, 1720, 1730, 1820, 1830. In the notification 2000, the angles, gains, and beamwidths are standalone values, with the values for each radiation pattern being determinable independently. Codes for physical states may be provided that correspond to the respective antenna system characteristics. The antenna system characteristics may be stored, e.g., by the TRP 300 and/or the server 400, and used when analyzing signals received from the UE 1400 and/or analyzing indications received from the UE 1400 of signal measurements made by the UE 1400. In the notification 2000, the angles, gains, and beamwidths are differential values, with the values for the radiation patterns 1700, 1800 being differential values relative to the values for the radiation pattern 1600. A radiation pattern other than the radiation pattern 1600 (e.g., a most-recent radiation pattern) may be used as a reference relative to which to determine and indicate the differential values.

Referring also to FIG. 22, antenna system characteristics may be dependent upon a frequency of operation of the antenna system 1421 and thus the antenna system characteristic notification unit 1460 may indicate the frequency (ies) to which indicated antenna system characteristics are applicable. For example, the antenna system characteristic notification unit 1460 may send a notification 2200 that indicates radiation patterns for combinations of the physical states PS1, PS2, PS3 and frequency. In the notification 2200, there are different radiation patterns indicated for the first physical state PS1 for frequencies F1 and F2, respectively. The frequency may be indicated in terms of component carrier(s), bandwidth part(s) (BWP(s)), and/or frequency band(s). The terms A111 and G111 represent the angle value and gain value for the first physical state PS1, the frequency F1, and the first angle value and the first gain value, respectively. Either of the frequencies F1, F2 may be a single frequency or a range of frequencies. Also in the example of the notification 2200, the terms A211 and G211 represent the angle value and gain value for the second physical state PS2, the frequency F1, and the first angle value and the first gain value, respectively. The terms A231 and G231 represent the angle value and gain value for the second physical state PS2, a third frequency F3, and the first angle value and the first gain value, respectively. The angle and gain values may be differential values relative to a reference radiation pattern, e.g., the radiation pattern corresponding to the first physical state PS1 and the frequency F1.

A reporting priority may be implemented by the antenna system characteristic notification unit 1460 to report the radiation patterns. For example, the antenna system characteristic notification unit 1460 may be configured to report the radiation patterns for different frequencies for the same physical state before reporting a radiation pattern for a different physical state. For example, with the radiation patterns reported in the order shown in the notification 2200, the differential radiation pattern for the first physical state PSI and the frequency F2 is reported before the differential radiation pattern for the second physical state PS2 and the frequency F1 is reported. The reporting priority implemented by the antenna system characteristic notification unit 1460 may be dynamic, changing over time.

Also or alternatively, other antenna system characteristics may be provided. For example, referring also to FIG. 23, the antenna system characteristic notification unit 1460 may provide a notification 2300 indicating one or more of beam weights, frequency of operation, inter-antenna-element spacing, inter-antenna-system orientation, and inter-antenna-system electrical separation corresponding to different physical states of the UE 1400. Beam weights are the phase shifter responses and/or amplitude responses of antenna elements in order to produce a desired beam pattern from a multi-element array. In this example, different values of beam weights, inter-antenna-element spacing, inter-antenna-system orientation, and inter-antenna-system electrical separation corresponding to different frequencies of operation are provided. If the UE 1400 includes more than one antenna system, then the values of the characteristics provided in the notification 2300 may include for which antenna system the characteristic values are applicable. A state code may be used to implicitly indicate the corresponding characteristics. In this example, the state code corresponds to a physical state and a frequency of operation. Still other characteristics may be provided, such as an angle between the line 651 corresponding to the orientation of the antenna element 521 (or an antenna system) in the state 610 and the orientation 632 of the antenna element 522 (or another antenna system).

Figure 24:
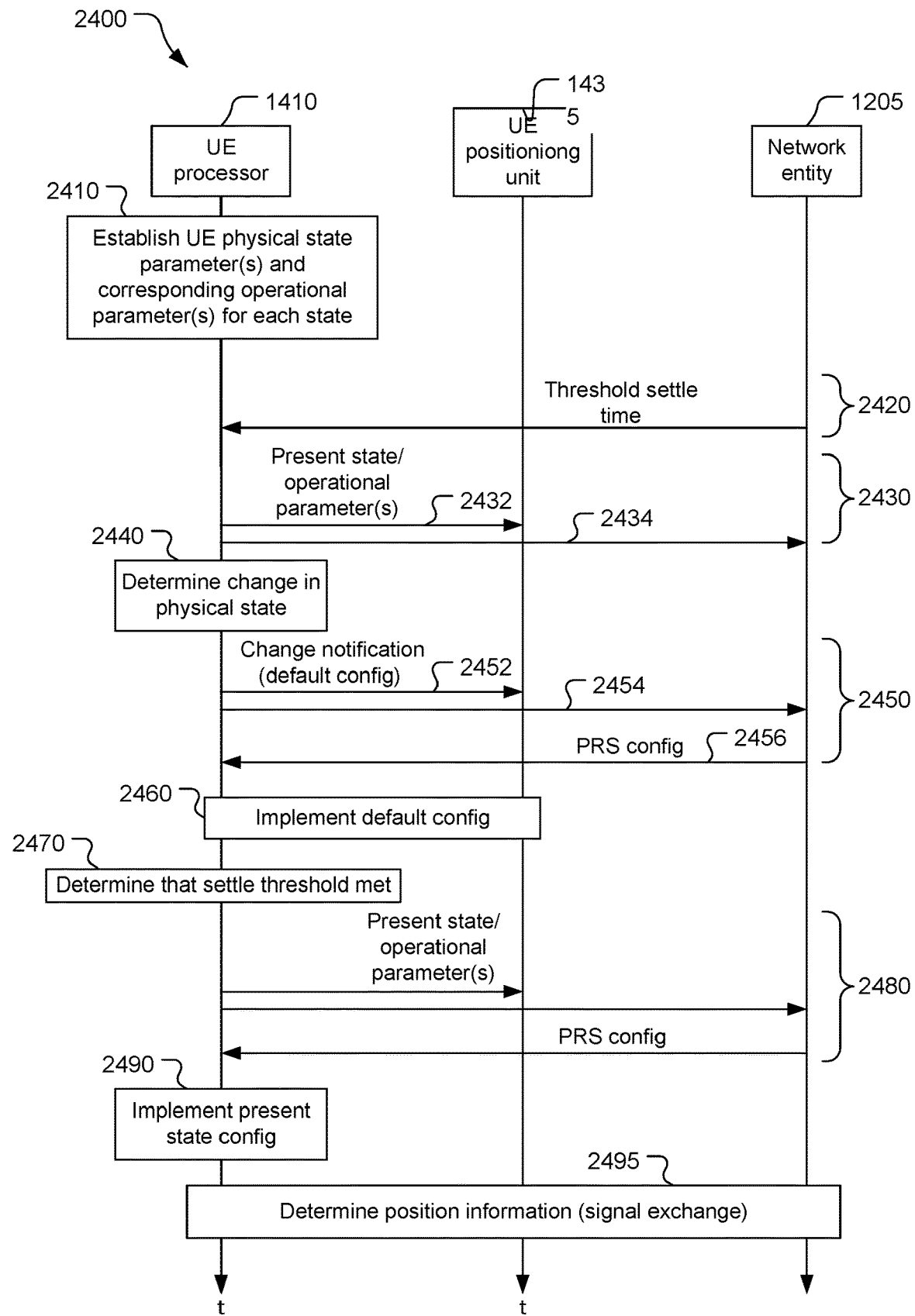
FIG. 24 is another signaling and process flow for providing notifications of antenna characteristics corresponding to physical state change of a user equipment and determining position information.

Referring to FIG. 24, with further reference to FIGS. 1-23, a signaling and process flow 2400 for providing notifications of antenna characteristics corresponding to physical state change (and possibly of the physical state change) of a UE and determining position information based on such changes includes the stages shown. The flow 2400 is an example only, as stages may be added, rearranged, and/or removed. For example, one or more of stages 2420, 2430, 2450, 2460, and 2470 may be omitted. Any of the stages shown and discussed may be modified, e.g., to include more or fewer actions, or to provide more or less or different information, etc. The flow 2400 is similar to the flow 1200, with stages 2410, 2420, 2430, 2440, 2450, 2460, 2470, 2480, 2490, and 2495 being similar to stages 1210, 1220, 1230, 1240, 1250, 1260, 1270, 1280, 1290, and 1295 of the flow 1200, and thus some stages of the flow 2400 are not discussed below or not discussed in detail.

At stage 2430, the processor 1410 provides present state/operational parameter(s) notifications 2432, 2434 to the positioning unit 1435 and the network entity 1205, respectively. The notifications 2432, 2434 may comprise, for example, one or more physical parameter values and/or one or more operational parameter values such as antenna system characteristics, for example, in a notification such as any of the notifications 1900, 2000, 2100, 2200, 2300. The notifications 2432, 2434 may indicate the value(s) directly (e.g., comprising one or more values of the notification 1900, 2000, 2100, 2200, 2300) or indirectly (e.g., by indicating a value of a state code).

At stage 2450, the processor 1410 sends change notifications 2452, 2454 to the positioning unit 1435 and the network entity 1205, respectively. The change notifications 2452, 2454 may indicate that the physical state of the UE 1400 has changed or is expected to change (and possibly when). The notifications 2452, 2454 may provide information as to how the physical state has changed or will change (e.g., what the physical state has or is expected to changed to), or simply that the physical state has changed, or will change, without further information. The notifications 2452, 2454 may provide information as to the state change, e.g., antenna system characteristics such as those in the notifications 1900, 2000, 2100, 2200, 2300. The information provided in the notifications 2452, 2454 may be independent values or may indicate differential values relative to other values (e.g., as shown in the notification 2100). As with stage 1250 of the flow 1200, the network entity 1205 may send a PRS configuration message 2456 with a DL-PRS configuration and/or a UL-PRS configuration, e.g., based on the request or recommendation received from the UE 1400. The notifications 2452, 2454, similar to the notifications 1252, 1254, may indicate a default (baseline) configuration. For example, the default configuration may be a default set of operational parameter values, e.g., a worst-case set of antenna system characteristic values from multiple possible sets of antenna system characteristic values (each set including one or more operational parameter values).

Figure 25:
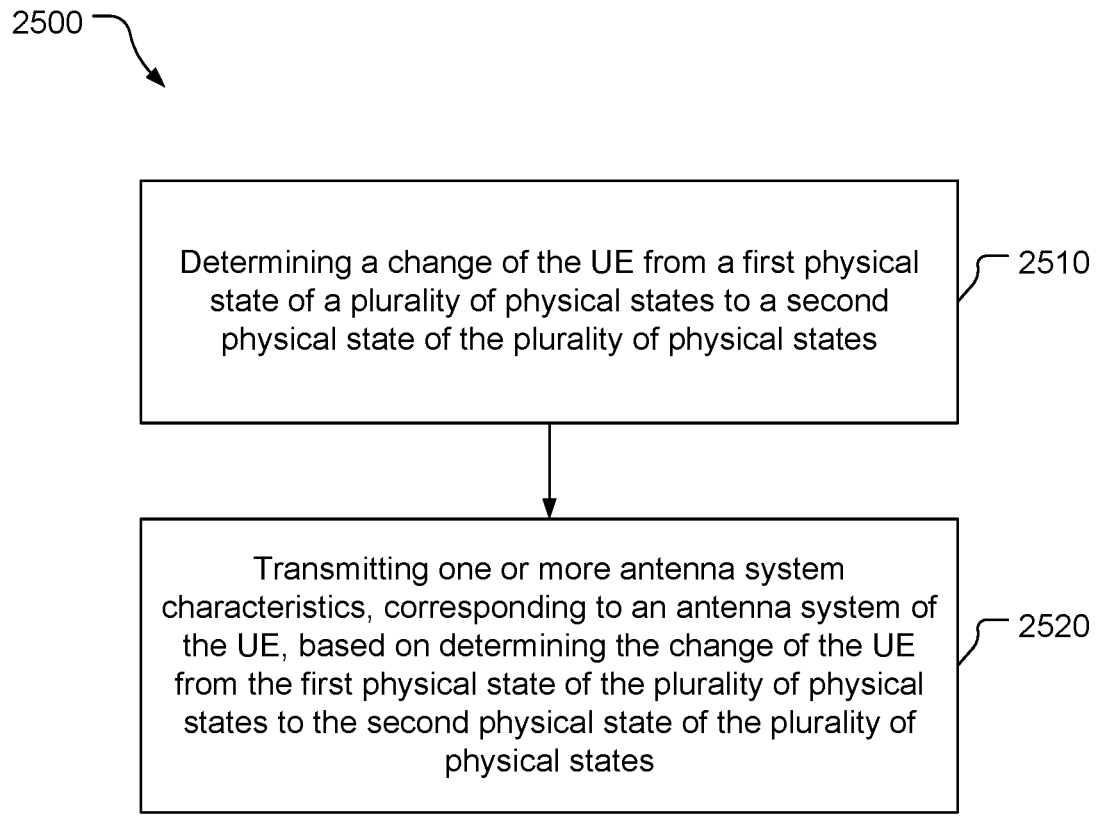
FIG. 25 is a block flow diagram of a method for indicating change in physical state of a user equipment.

Referring to FIG. 25, with further reference to FIGS. 1-24, a method 2500 for indicating change in physical state of a UE includes the stages shown. The method 2500 is, however, an example only and not limiting. The method 2500 may be altered, e.g., by having stages added, removed, rearranged, combined, performed concurrently, and/or having single stages split into multiple stages.

At stage 2510, the method 2500 includes determining a change of the UE from a first physical state of a plurality of physical states to a second physical state of the plurality of physical states. For example, the physical state determination unit 1450 may determine that the UE 1400 has changed, or is expected to change, physical states (e.g., based on one or more sensor measurements, a schedule of planned movements, etc.). The processor 1410, possibly in combination with the memory 1430, possibly in combination with one or more sensors (e.g., of the sensor(s) 213), may comprise means for determining a change of the UE from the first physical state to the second physical state.

At stage 2520, the method 2500 includes transmitting one or more antenna system characteristics, corresponding to an antenna system of the UE, based on determining the change of the UE from the first physical state of the plurality of physical states to the second physical state of the plurality of physical states. For example, the antenna system characteristic notification unit 1460 may transmit, via the transceiver 1420, one or more characteristics of the antenna system 1421 (e.g., radiation pattern(s), radiation pattern property(ies), frequency of operation, beam weights, etc., e.g., such as any of the notifications 1900, 2000, 2100, 2200, 2300). The antenna system 1421 is retained by a body of the UE, e.g., attached by adhesive to a frame or housing, or contained within a housing, etc. The processor 1410, possibly in combination with the memory 1430, in combination with the transceiver 1420 (e.g., the wireless transmitter 242 and the antenna 246), may comprise means for transmitting the one or more antenna system characteristics.

Implementations of the method 2500 may include one or more of the following features. In an example implementation, the antenna system has a plurality of radiation patterns that are different from each other and that each correspond to one or more of the plurality of physical states, and the one or more antenna system characteristics comprises a radiation pattern indication indicating at least one the plurality of radiation patterns. For example, the antenna system characteristic notification unit 1460 may transmit a notification such as any of the notifications 1900, 2000, 2100, 2200 or the or other indication of one or more radiation patterns and/or radiation pattern properties and/or one or more coded indications of radiation pattern and/or radiation pattern properties. In a further example implementation, the radiation pattern indication explicitly indicates the at least one of the plurality of radiation patterns, the radiation pattern indication including a plurality of pairs of indications of angle and gain for each of the at least one of the plurality of radiation patterns. For example, the antenna system characteristic notification unit 1460 may transmit the notification 1900 or other indication of one or more radiation patterns that indicates pairs of angle and gain values. In another further example implementation, the radiation pattern indication includes one or more radiation pattern characteristics including: main beam angle; or main beam beamwidth; or side lobe angle; or side lobe beamwidth. For example, the antenna system characteristic notification unit 1460 may transmit the notification 2100 or other indication of radiation pattern characteristics. In another further example implementation, transmitting the one or more antenna system characteristics comprises transmitting the radiation pattern indication indicating a same radiation pattern, of the plurality of radiation patterns, based on movement of the UE to at least two of the plurality of physical states. For example, multiple physical states of the UE 1400 (e.g., with similar radiation patterns) may be grouped for purposes of reporting the antenna system characteristic(s) such that the same radiation pattern indication is provided for multiple physical states of the UE 1400. The radiation pattern indication provided for the multiple physical states may indicate the poorest radiation pattern (or the properties of such pattern) over the grouped physical states. In another further example implementation, transmitting the radiation pattern indication comprises transmitting a code corresponding to one of the plurality of radiation patterns of the antenna system. For example, the antenna system characteristic notification unit 1460 may transmit physical state code or a state code that corresponds to a radiation pattern (e.g., angles and gains, or properties of the radiation pattern). The code may be transmitted in conjunction with the antenna system characteristic(s) (e.g., as part of a capability message) in a training message (before or after sending the code without the antenna system characteristic(s)) to associate the code with the antenna system characteristic(s). The code may be transmitted without the antenna system characteristic(s) in other messages and the associated antenna system characteristic(s) used. This helps save overhead in indicating the antenna characteristic(s) multiple times. In another further example implementation, transmitting the one or more antenna system characteristics comprises transmitting the radiation pattern indication in response to detecting movement of the UE from the first physical state of the plurality of physical states to the second physical state of the plurality of physical states. In another further example implementation, transmitting the one or more antenna system characteristics comprises transmitting the radiation pattern indication in response to determining an expected movement of the UE from the first physical state of the plurality of physical states to the second physical state of the plurality of physical states. For example, the antenna system characteristic notification unit 1460 may transmit the antenna system characteristic(s) before a change in physical state of the UE 1400. In another further example implementation, the radiation pattern indication indicates the at least one the plurality of radiation patterns as differential values relative to a reference radiation pattern. The reference radiation pattern may, for example, be a baseline radiation pattern used as a reference for determining differential values for multiple radiation patterns, or may be another radiation pattern such as a most-recently indicated radiation pattern. In another further example implementation, transmitting the one or more antenna system characteristics comprises transmitting the radiation pattern indication based on a change in frequency of operation of the antenna system.

Also or alternatively, implementations of the method 2500 may include one or more of the following features. In an example implementation, the one or more antenna system characteristics comprises: beam weights; or frequency of operation of the antenna system; or a combination thereof.

Implementation Examples

Implementation examples are provided in the following numbered clauses.

Clause 1. A UE (user equipment) comprising:
a body that is movable to a plurality of physical states having different physical arrangements;
a transceiver including an antenna system comprising at least one antenna element;
a memory; and
a processor communicatively coupled to the transceiver and the memory and configured to transmit one or more antenna system characteristics via the transceiver based on change of the body from a first physical state of the plurality of physical states to a second physical state of the plurality of physical states.

Clause 2. The UE of clause 1, wherein the antenna system has a plurality of radiation patterns that are different from each other and that each correspond to one or more of the plurality of physical states, and the one or more antenna system characteristics comprises a radiation pattern indication indicating at least one the plurality of radiation patterns.

Clause 3. The UE of clause 2, wherein the radiation pattern indication explicitly indicates the at least one of the plurality of radiation patterns, the radiation pattern indication including a plurality of pairs of indications of angle and gain for each of the at least one of the plurality of radiation patterns.

Clause 4. The UE of clause 2, wherein the radiation pattern indication includes one or more radiation pattern characteristics including:
main beam angle; or
main beam beamwidth; or
side lobe angle; or
side lobe beamwidth.

Clause 5. The UE of clause 2, wherein the processor is configured to transmit the radiation pattern indication indicating a same radiation pattern, of the plurality of radiation patterns, based on movement of the body to at least two of the plurality of physical states.

Clause 6. The UE of clause 2, wherein the processor is configured to transmit the radiation pattern indication indicating a code corresponding to one of the plurality of radiation patterns of the antenna system.

Clause 7. The UE of clause 2, wherein the processor is configured to transmit the radiation pattern indication in response to detecting movement of the body from the first physical state of the plurality of physical states to the second physical state of the plurality of physical states.

Clause 8. The UE of clause 2, wherein the processor is configured to transmit the radiation pattern indication in response to determining an expected movement of the body from the first physical state of the plurality of physical states to the second physical state of the plurality of physical states.

Clause 9. The UE of clause 2, wherein the radiation pattern indication indicates the at least one the plurality of radiation patterns as differential values relative to a reference radiation pattern.

Clause 10. The UE of clause 2, wherein the processor is further configured to transmit the radiation pattern indication based on a change in frequency of operation of the antenna system.

Clause 11. The UE of clause 1, wherein the one or more antenna system characteristics comprises:
beam weights; or
frequency of operation of the antenna system; or
a combination thereof.

Clause 12. A method at a UE (user equipment) for indicating change in physical state of the UE, the method comprising:
determining a change of the UE from a first physical state of a plurality of physical states to a second physical state of the plurality of physical states; and
transmitting one or more antenna system characteristics, corresponding to an antenna system of the UE, based on determining the change of the UE from the first physical state of the plurality of physical states to the second physical state of the plurality of physical states.

Clause 13. The method of clause 12, wherein the antenna system has a plurality of radiation patterns that are different from each other and that each correspond to one or more of the plurality of physical states, and the one or more antenna system characteristics comprises a radiation pattern indication indicating at least one the plurality of radiation patterns.

Clause 14. The method of clause 13, wherein the radiation pattern indication explicitly indicates the at least one of the plurality of radiation patterns, the radiation pattern indication including a plurality of pairs of indications of angle and gain for each of the at least one of the plurality of radiation patterns.

Clause 15. The method of clause 13, wherein the radiation pattern indication includes one or more radiation pattern characteristics including:
main beam angle; or
main beam beamwidth; or
side lobe angle; or
side lobe beamwidth.

Clause 16. The method of clause 13, wherein transmitting the one or more antenna system characteristics comprises transmitting the radiation pattern indication indicating a same radiation pattern, of the plurality of radiation patterns, based on movement of the UE to at least two of the plurality of physical states.

Clause 17. The method of clause 13, wherein transmitting the radiation pattern indication comprises transmitting the radiation pattern indication indicating a code corresponding to one of the plurality of radiation patterns of the antenna system.

Clause 18. The method of clause 13, wherein transmitting the one or more antenna system characteristics comprises transmitting the radiation pattern indication in response to detecting movement of the UE from the first physical state of the plurality of physical states to the second physical state of the plurality of physical states.

Clause 19. The method of clause 13, wherein transmitting the one or more antenna system characteristics comprises transmitting the radiation pattern indication in response to determining an expected movement of the UE from the first physical state of the plurality of physical states to the second physical state of the plurality of physical states.

Clause 20. The method of clause 13, wherein the radiation pattern indication indicates the at least one the plurality of radiation patterns as differential values relative to a reference radiation pattern.

Clause 21. The method of clause 13, wherein transmitting the one or more antenna system characteristics comprises transmitting the radiation pattern indication based on a change in frequency of operation of the antenna system.

Clause 22. The method of clause 12, wherein the one or more antenna system characteristics comprises:
beam weights; or
frequency of operation of the antenna system; or
a combination thereof.

Clause 23. A UE (user equipment) comprising:
means for determining a change of the UE from a first physical state of a plurality of physical states to a second physical state of the plurality of physical states; and
means for transmitting one or more antenna system characteristics, corresponding to an antenna system of the UE, based on determining the change of the UE from the first physical state of the plurality of physical states to the second physical state of the plurality of physical states.

Clause 24. The UE of clause 23, wherein the antenna system has a plurality of radiation patterns that are different from each other and that each correspond to one or more of the plurality of physical states, and the one or more antenna system characteristics comprises a radiation pattern indication indicating at least one the plurality of radiation patterns.

Clause 25. The UE of clause 24, wherein the radiation pattern indication explicitly indicates the at least one of the plurality of radiation patterns, the radiation pattern indication including a plurality of pairs of indications of angle and gain for each of the at least one of the plurality of radiation patterns.

Clause 26. The UE of clause 24, wherein the radiation pattern indication includes one or more radiation pattern characteristics including:
main beam angle; or
main beam beamwidth; or
side lobe angle; or
side lobe beamwidth.

Clause 27. The UE of clause 24, wherein the means for transmitting the one or more antenna system characteristics comprise means for transmitting the radiation pattern indication indicating a same radiation pattern, of the plurality of radiation patterns, based on movement of the UE to at least two of the plurality of physical states.

Clause 28. The UE of clause 24, wherein the means for transmitting the radiation pattern indication comprise means for transmitting the radiation pattern indication indicating a code corresponding to one of the plurality of radiation patterns of the antenna system.

Clause 29. The UE of clause 24, wherein the means for transmitting the one or more antenna system characteristics comprise means for transmitting the radiation pattern indication in response to detecting movement of the UE from the first physical state of the plurality of physical states to the second physical state of the plurality of physical states.

Clause 30. The UE of clause 24, wherein the means for transmitting the one or more antenna system characteristics comprise means for transmitting the radiation pattern indication in response to determining an expected movement of the UE from the first physical state of the plurality of physical states to the second physical state of the plurality of physical states.

Clause 31. The UE of clause 24, wherein the radiation pattern indication indicates the at least one the plurality of radiation patterns as differential values relative to a reference radiation pattern.

Clause 32. The UE of clause 24, wherein the means for transmitting the one or more antenna system characteristics comprise means for transmitting the radiation pattern indication based on a change in frequency of operation of the antenna system.

Clause 33. The UE of clause 23, wherein the one or more antenna system characteristics comprises:
beam weights; or
frequency of operation of the antenna system; or
a combination thereof.

Clause 34. A non-transitory, processor-readable storage medium comprising processor-readable instructions to cause a processor of a UE (user equipment) to:
determine a change of the UE from a first physical state of a plurality of physical states to a second physical state of the plurality of physical states; and
transmit one or more antenna system characteristics, corresponding to an antenna system of the UE, based on determining the change of the UE from the first physical state of the plurality of physical states to the second physical state of the plurality of physical states.

Clause 35. The storage medium of clause 34, wherein the antenna system has a plurality of radiation patterns that are different from each other and that each correspond to one or more of the plurality of physical states, and the one or more antenna system characteristics comprises a radiation pattern indication indicating at least one the plurality of radiation patterns.

Clause 36. The storage medium of clause 35, wherein the radiation pattern indication explicitly indicates the at least one of the plurality of radiation patterns, the radiation pattern indication including a plurality of pairs of indications of angle and gain for each of the at least one of the plurality of radiation patterns.

Clause 37. The storage medium of clause 35, wherein the radiation pattern indication includes one or more radiation pattern characteristics including:
main beam angle; or
main beam beamwidth; or
side lobe angle; or
side lobe beamwidth.

Clause 38. The storage medium of clause 35, wherein the processor-readable instructions to cause the processor to transmit the one or more antenna system characteristics comprise processor-readable instructions to cause the processor to transmit the radiation pattern indication indicating a same radiation pattern, of the plurality of radiation patterns, based on movement of the UE to at least two of the plurality of physical states.

Clause 39. The storage medium of clause 35, wherein the processor-readable instructions to cause the processor to transmit the radiation pattern indication comprise processor-readable instructions to cause the processor to transmit the radiation pattern indication indicating a code corresponding to one of the plurality of radiation patterns of the antenna system.

Clause 40. The storage medium of clause 35, wherein the processor-readable instructions to cause the processor to transmit the one or more antenna system characteristics comprise processor-readable instructions to cause the processor to transmit the radiation pattern indication in response to detecting movement of the UE from the first physical state of the plurality of physical states to the second physical state of the plurality of physical states.

Clause 41. The storage medium of clause 35, wherein the processor-readable instructions to cause the processor to transmit the one or more antenna system characteristics comprise processor-readable instructions to cause the processor to transmit the radiation pattern indication in response to determining an expected movement of the UE from the first physical state of the plurality of physical states to the second physical state of the plurality of physical states.

Clause 42. The storage medium of clause 35, wherein the radiation pattern indication indicates the at least one the plurality of radiation patterns as differential values relative to a reference radiation pattern.

Clause 43. The storage medium of clause 35, wherein the processor-readable instructions to cause the processor to transmit the one or more antenna system characteristics comprise processor-readable instructions to cause the processor to transmit the radiation pattern indication based on a change in frequency of operation of the antenna system.

Clause 44. The storage medium of clause 34, wherein the one or more antenna system characteristics comprises:
beam weights; or
frequency of operation of the antenna system; or
a combination thereof.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A UE (user equipment) comprising:
a body that is movable to a plurality of physical states having different physical arrangements with distinct portions of the body having different spatial relationships relative to each other in different ones of the plurality of physical states;
a transceiver including an antenna system comprising at least one antenna element;
a memory; and
a processor communicatively coupled to the transceiver and the memory and configured to:
determine a dynamic change of the UE from a first physical state of the plurality of physical states to a second physical state of the plurality of physical states with distinct portions of the body of the UE having different spatial relationships relative to each other in the first physical state of the plurality of physical states and the second physical state of the plurality of physical states; and
transmit, via the transceiver to a network entity and based on a determination of the dynamic change of the UE from a first physical state of the plurality of physical states to a second physical state of the plurality of physical states, a notification of one or more antenna system characteristics of the second physical state of the plurality of states based on the dynamic change of the body from the first physical state of the plurality of physical states to the second physical state of the plurality of physical states;
wherein the antenna system has a plurality of radiation patterns that are different from each other and that each correspond to one or more of the plurality of physical states, and the notification comprises a radiation pattern indication indicating at least one of the plurality of radiation patterns.

2. The UE of claim 1, wherein the notification explicitly indicates the at least one of the plurality of radiation patterns, notification including a plurality of pairs of indications of angle and gain for each of the at least one of the plurality of radiation patterns.

3. The UE of claim 1, wherein the notification includes one or more radiation pattern characteristics including:
main beam angle; or
main beam beamwidth; or
side lobe angle; or
side lobe beamwidth.

4. The UE of claim 1, wherein the processor is configured to transmit the notification indicating a same radiation pattern, of the plurality of radiation patterns, based on movement of the body to at least two of the plurality of physical states.

5. The UE of claim 1, wherein the processor is configured to transmit the notification indicating a code corresponding to one of the plurality of radiation patterns of the antenna system.

6. The UE of claim 1, wherein the processor is configured to transmit the notification in response to detecting movement of the body from the first physical state of the plurality of physical states to the second physical state of the plurality of physical states.

7. The UE of claim 1, wherein the processor is configured to transmit the notification in response to determining an expected movement of the body from the first physical state of the plurality of physical states to the second physical state of the plurality of physical states.

8. The UE of claim 1, wherein the notification indicates the at least one of the plurality of radiation patterns as differential values relative to a reference radiation pattern.

9. The UE of claim 1, wherein the processor is further configured to transmit the notification based on a change in frequency of operation of the antenna system.

10. The UE of claim 1, wherein the one or more antenna system characteristics comprises:
beam weights; or
frequency of operation of the antenna system; or
a combination thereof.

11. A method at a UE (user equipment) for indicating change in physical state of the UE, the method comprising:
determining a dynamic change of the UE from a first physical state of a plurality of physical states to a second physical state of the plurality of physical states with distinct portions of a body of the UE having different spatial relationships relative to each other in the first physical state of the plurality of physical states and the second physical state of the plurality of physical states; and
transmitting, from the UE to a network entity and based on a determination of the dynamic change of the UE from a first physical state of the plurality of physical states to a second physical state of the plurality of physical states, a notification of one or more antenna system characteristics of the second physical state of the plurality of states, corresponding to an antenna system of the UE, based on determining the dynamic change of the UE from the first physical state of the plurality of physical states to the second physical state of the plurality of physical states;
wherein the antenna system has a plurality of radiation patterns that are different from each other and that each correspond to one or more of the plurality of physical states, and the notification comprises a radiation pattern indication indicating at least one of the plurality of radiation patterns.

12. The method of claim 11, wherein the notification explicitly indicates the at least one of the plurality of radiation patterns, the notification including a plurality of pairs of indications of angle and gain for each of the at least one of the plurality of radiation patterns.

13. The method of claim 11, wherein the notification includes one or more radiation pattern characteristics including:
main beam angle; or
main beam beamwidth; or
side lobe angle; or
side lobe beamwidth.

14. The method of claim 11, wherein transmitting the notification comprises transmitting the notification indicating a same radiation pattern, of the plurality of radiation patterns, based on movement of the UE to at least two of the plurality of physical states.

15. The method of claim 11, wherein transmitting the notification comprises transmitting the notification indicating a code corresponding to one of the plurality of radiation patterns of the antenna system.

16. The method of claim 11, wherein transmitting the notification comprises transmitting the notification in response to detecting movement of the UE from the first physical state of the plurality of physical states to the second physical state of the plurality of physical states.

17. The method of claim 11, wherein transmitting the notification comprises transmitting the notification in response to determining an expected movement of the UE from the first physical state of the plurality of physical states to the second physical state of the plurality of physical states.

18. The method of claim 11, wherein the notification indicates the at least one the plurality of radiation patterns as differential values relative to a reference radiation pattern.

19. The method of claim 11, wherein transmitting the notification comprises transmitting the notification based on a change in frequency of operation of the antenna system.

20. The method of claim 11, wherein the one or more antenna system characteristics comprises:
beam weights; or
frequency of operation of the antenna system; or
a combination thereof.

21. A UE (user equipment) comprising:
means for determining a dynamic change of the UE from a first physical state of a plurality of physical states to a second physical state of the plurality of physical states with distinct portions of a body of the UE having different spatial relationships relative to each other in the first physical state of the plurality of physical states and the second physical state of the plurality of physical states; and
means for transmitting, from the UE to a network entity and based on a determination of the dynamic change of the UE from a first physical state of the plurality of physical states to a second physical state of the plurality of physical states, a notification of one or more antenna system characteristics of the second physical state of the plurality of states, corresponding to an antenna system of the UE, based on determining the dynamic change of the UE from the first physical state of the plurality of physical states to the second physical state of the plurality of physical states;
wherein the antenna system has a plurality of radiation patterns that are different from each other and that each correspond to one or more of the plurality of physical states, and the notification comprises a radiation pattern indication indicating at least one of the plurality of radiation patterns.

22. The UE of claim 21, wherein the notification explicitly indicates the at least one of the plurality of radiation patterns, the notification including a plurality of pairs of indications of angle and gain for each of the at least one of the plurality of radiation patterns.

23. The UE of claim 21, wherein the notification includes one or more radiation pattern characteristics including:
main beam angle; or
main beam beamwidth; or
side lobe angle; or
side lobe beamwidth.

24. The UE of claim 21, wherein the means for transmitting the notification comprise means for transmitting the notification indicating a same radiation pattern, of the plurality of radiation patterns, based on movement of the UE to at least two of the plurality of physical states.

25. The UE of claim 21, wherein the means for transmitting the notification comprise means for transmitting the notification indicating a code corresponding to one of the plurality of radiation patterns of the antenna system.

26. A non-transitory, processor-readable storage medium comprising processor-readable instructions to cause a processor of a UE (user equipment) to:
determine a dynamic change of the UE from a first physical state of a plurality of physical states to a second physical state of the plurality of physical states with distinct portions of a body of the UE having different spatial relationships relative to each other in the first physical state of the plurality of physical states and the second physical state of the plurality of physical states; and
transmit, from the UE to a network entity and based on a determination of the dynamic change of the UE from a first physical state of the plurality of physical states to a second physical state of the plurality of physical states, a notification of one or more antenna system characteristics of the second physical state of the plurality of states, corresponding to an antenna system of the UE, based on determining the dynamic change of the UE from the first physical state of the plurality of physical states to the second physical state of the plurality of physical states;

wherein the antenna system has a plurality of radiation patterns that are different from each other and that each correspond to one or more of the plurality of physical states, and the notification comprises a radiation pattern indication indicating at least one of the plurality of radiation patterns.

* * * * *